(12) United States Patent
Yoshikawa

(10) Patent No.: US 8,684,836 B2
(45) Date of Patent: Apr. 1, 2014

(54) GAME SERVER, GAME CONTROLLING METHOD THEREOF, NON-TRANSITORY COMPUTER-READABLE MEDIUM AND GAME SYSTEM

(71) Applicant: gloops, Inc., Tokyo (JP)

(72) Inventor: Isao Yoshikawa, Tokyo (JP)

(73) Assignee: gloops, Inc., Tokyo (JP)

( * ) Notice: Subject to any disclaimer, the term of this patent is extended or adjusted under 35 U.S.C. 154(b) by 0 days.

(21) Appl. No.: 13/924,345

(22) Filed: Jun. 21, 2013

(65) Prior Publication Data

US 2013/0344953 A1    Dec. 26, 2013

(30) Foreign Application Priority Data

Jun. 22, 2012  (JP) ................. 2012-140803

(51) Int. Cl.
*A63F 13/00* (2006.01)
(52) U.S. Cl.
USPC .............................................. 463/30; 463/42
(58) Field of Classification Search
USPC ....................................... 463/1, 29, 30, 33, 42
See application file for complete search history.

(56) References Cited

U.S. PATENT DOCUMENTS

| 2002/0098885 A1 | 7/2002 | Sakaguchi |
| 2012/0064969 A1 | 3/2012 | Uchibori |

FOREIGN PATENT DOCUMENTS

| JP | H11-25288 | 1/1999 |
| JP | 2002-183762 | 6/2002 |
| JP | 2002-210255 | 7/2002 |
| JP | 2002-239216 | 8/2002 |
| JP | 2012-24248 | 2/2012 |
| JP | 2012-061060 | 3/2012 |

OTHER PUBLICATIONS

"Everquest II Playing Manual", Japan, Square Enix, p. 095.
"Monster Hunter Exploration Journal: Phantom Island", Dengeki Game Appli., Japan, Ascii Media Works, Feb. 14, 2012, vol. 2, pp. 6-7.
"Persona 4 the Golden", Weekly Famitsu, Japan, Enterbrain Inc., Sep. 1, 2011, vol. 26, No. 38, pp. 25-28.
Japanese Patent Application No. 2012-140803, Decision to Grant a Patent dated Apr. 15, 2013, 4 pages with English Translation.
Japanese Patent Application No. 2012-140803, Office Action dated Feb. 8, 2013, 8 pages with English Translation.

*Primary Examiner* — David L Lewis
*Assistant Examiner* — Robert Mosser
(74) *Attorney, Agent, or Firm* — Baker & Hostetler LLP

(57) ABSTRACT

A game server of the present disclosure comprises: a map data storing section that stores map data; a virtual position data table that stores identification data; a display process data transmitting section that transmits display process data; an operation data receiving section that receives operation data; a virtual user position changing section that changes a virtual user position; a data updating section that updates the identification data; a relationship building section that transmits relevant information regarding a virtual user other than a target virtual user; and an attribute information storing section. The relationship building section sets a screening area covering a predetermined distance from the virtual position of the target virtual user. Also, the relationship building section selects a virtual user with a higher level from among at least one other virtual user in the screening area and transmits relevant information regarding the other virtual user thus selected.

13 Claims, 19 Drawing Sheets

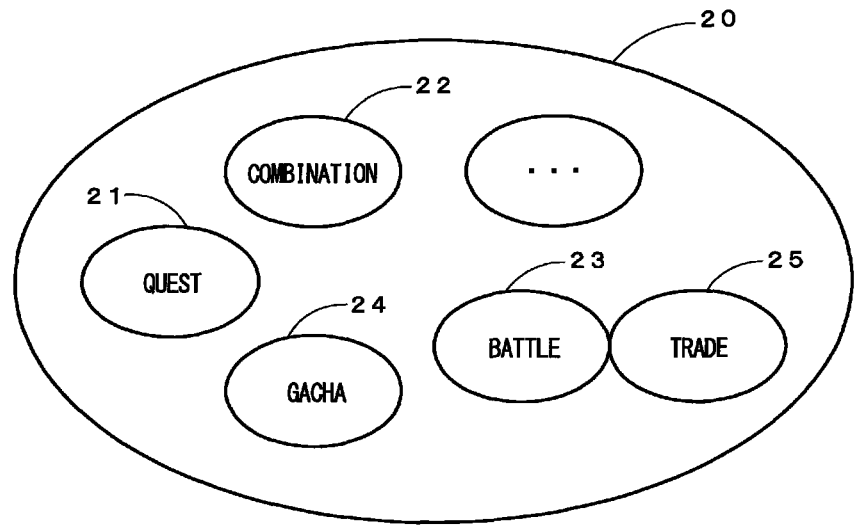
F I G. 2
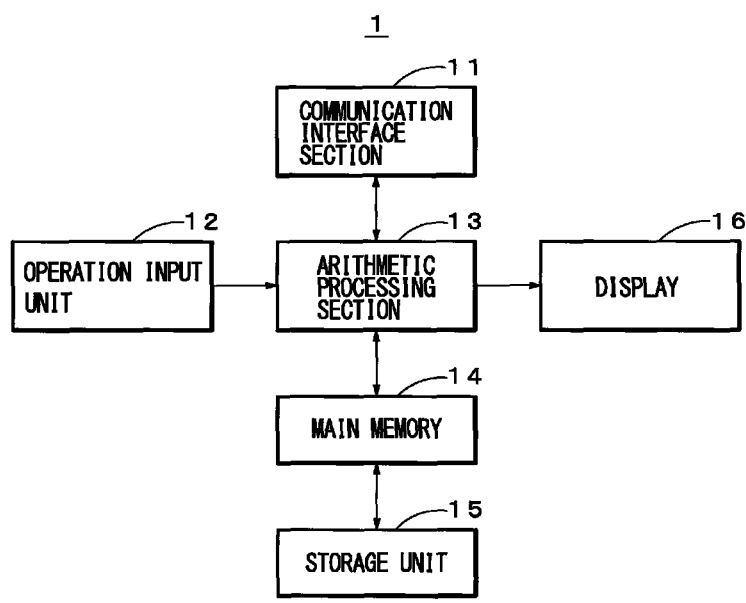
F I G. 3

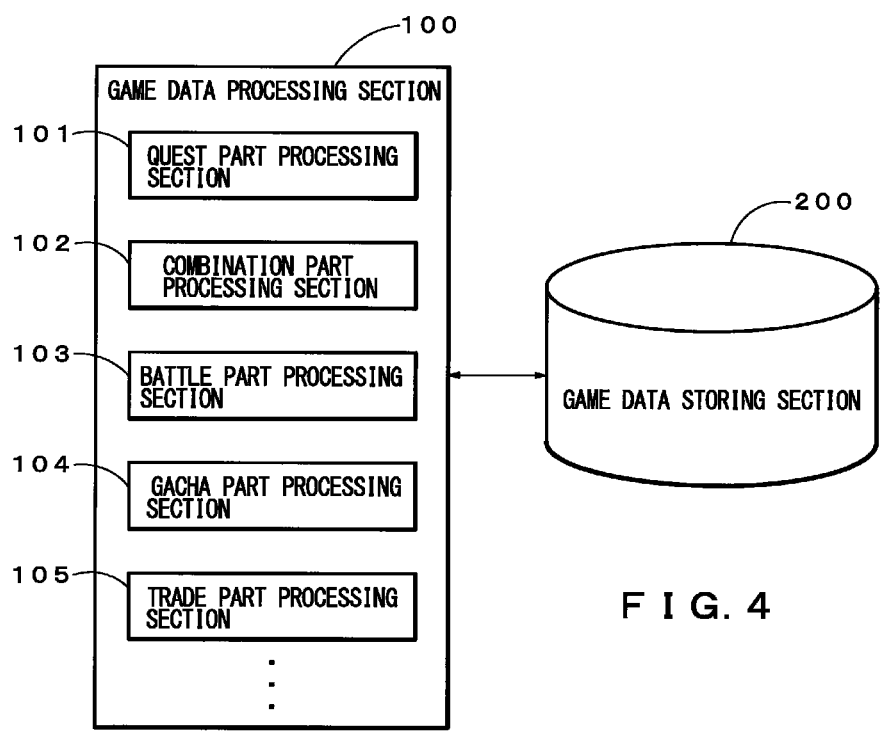
F I G. 4

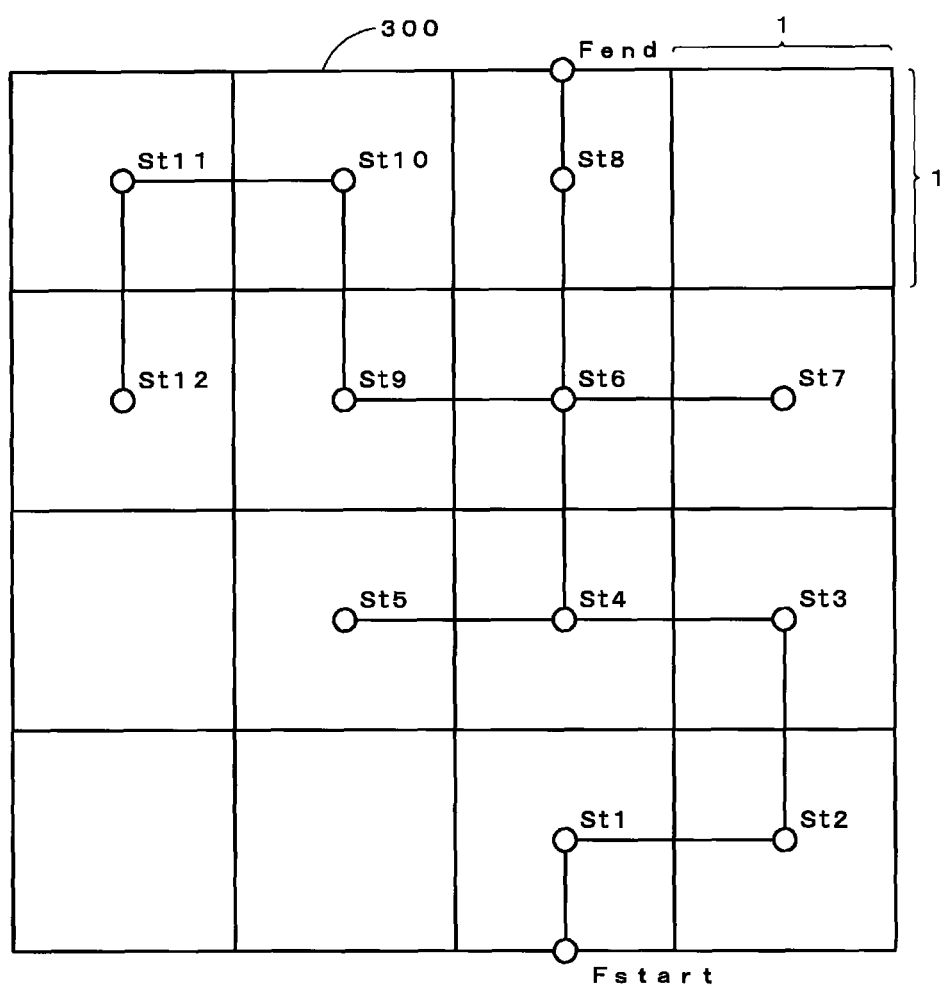
F I G. 6

| ID | POSITIONAL INFORMATION | LEVEL INFORMATION | QUEST POINT | BATTLE POINT | GACHA POINT | ACQUISITION CARD LIST INFORMATION |
|---|---|---|---|---|---|---|
| 10001 | St3 | L6 | 70 | 120 | 290 | |
| 10002 | St5 | L3 | 30 | 50 | 125 | |
| 10003 | St6 | L9 | 110 | 70 | 450 | |
| 10004 | St7 | L2 | 30 | 45 | 50 | |
| 10005 | St5 | L1 | 20 | 30 | 20 | |
| 10006 | St4 | L3 | 50 | | 40 | |
| 10007 | St5 | L1 | 20 | 30 | 60 | |
| 10008 | St2 | L1 | 25 | 30 | 45 | |
| ... | ... | ... | ... | ... | ... | ... |

~203

F I G. 9

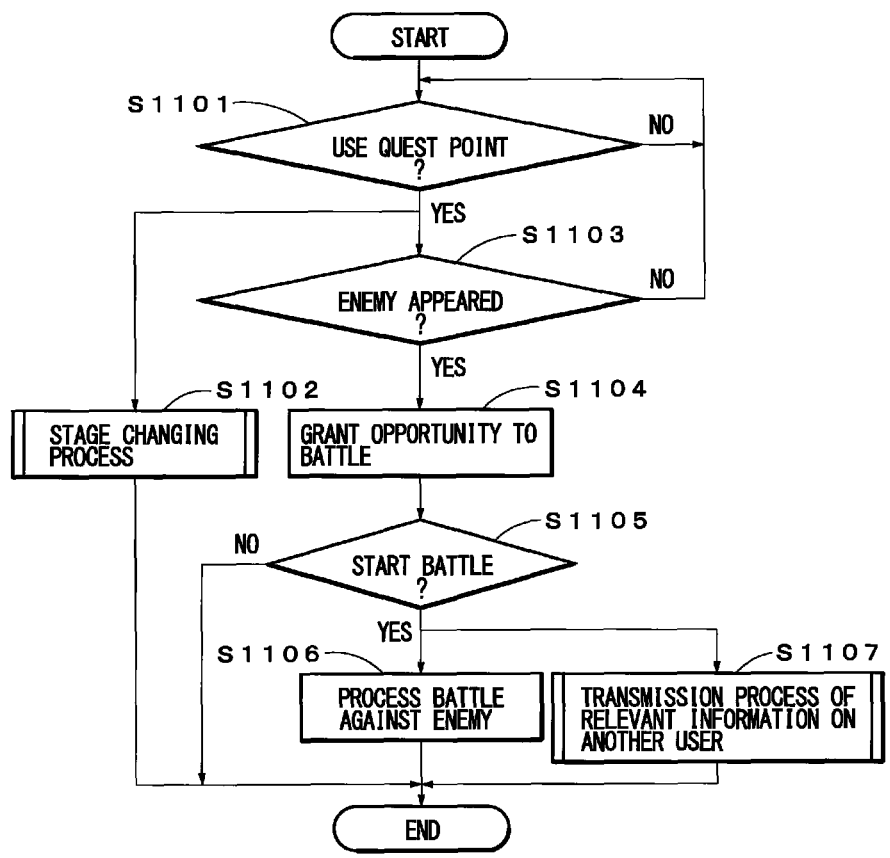
F I G. 11

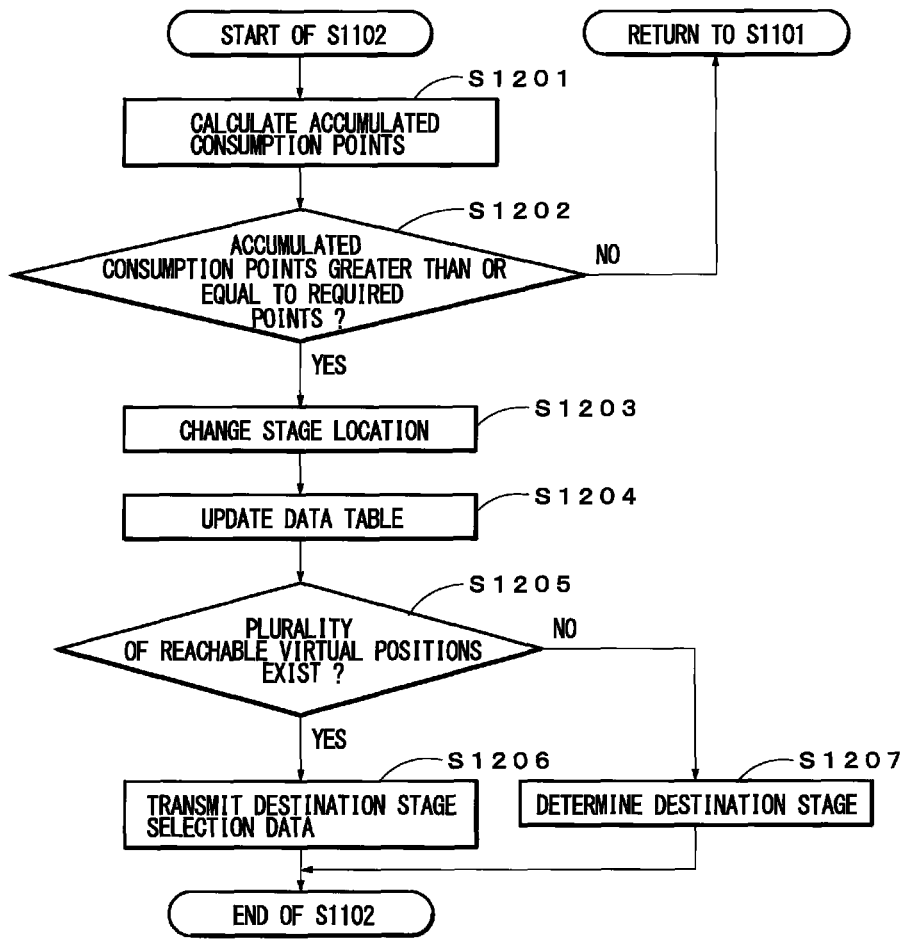
F I G. 1 2

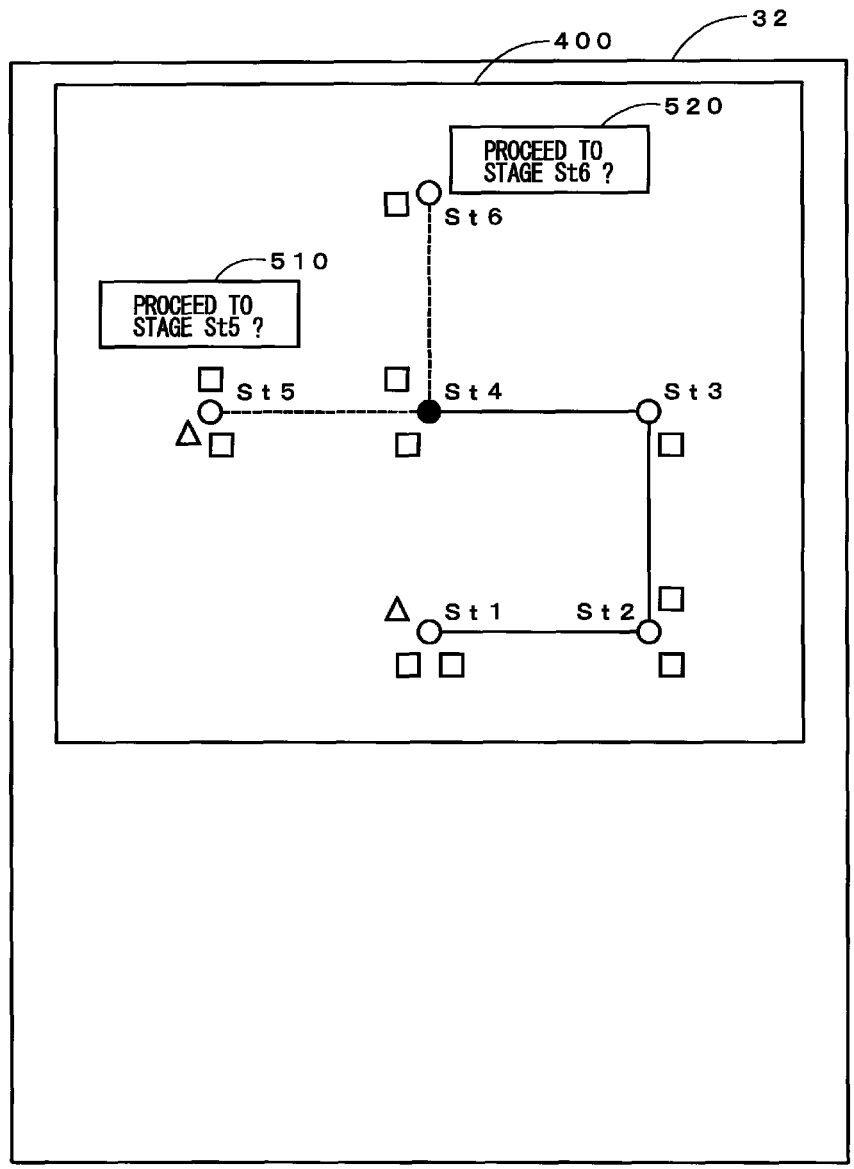
F I G. 13

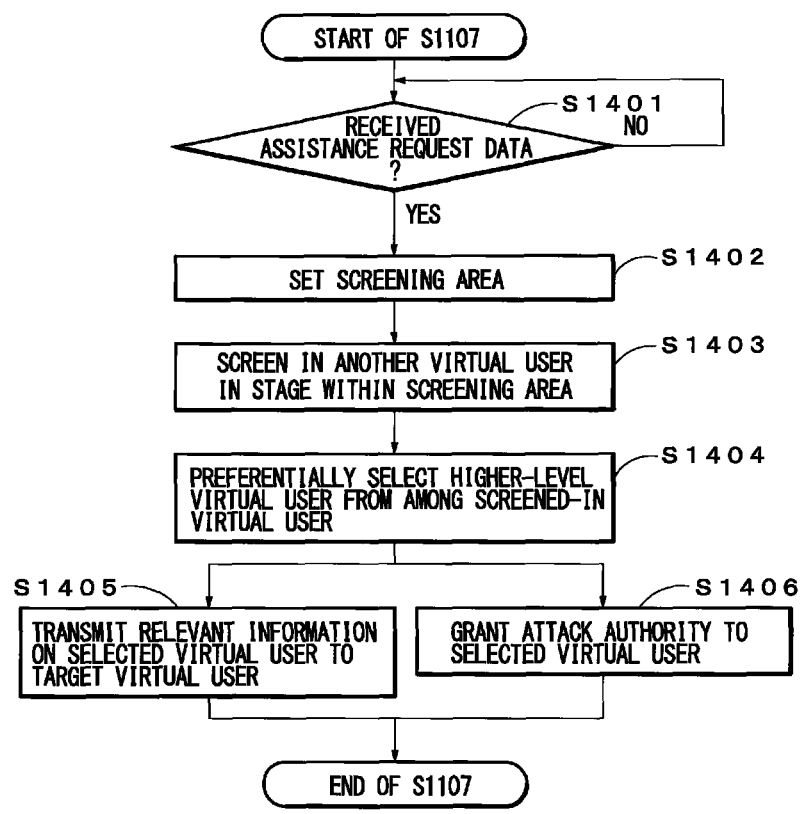
F I G. 14

| ID | POSITIONAL INFORMATION | LEVEL INFORMATION |
|---|---|---|
| 10234 | St4 | L21 |
| 10335 | St3 | L15 |
| 10255 | St5 | L2 |
| 10451 | St5 | L5 |
| 10221 | St6 | L12 |
| 10742 | St6 | L4 |
| 10654 | St1 | L8 |
| 10834 | St1 | L12 |
| ⋮ | ⋮ | ⋮ |

F I G. 16 A

| ID | POSITIONAL INFORMATION | LEVEL INFORMATION |
|---|---|---|
| 10234 | St4 | L21 |
| 10335 | St3 | L15 |
| 10221 | St6 | L12 |
| 10834 | St1 | L12 |
| 10654 | St1 | L8 |
| ⋮ | ⋮ | ⋮ |

F I G. 16 B

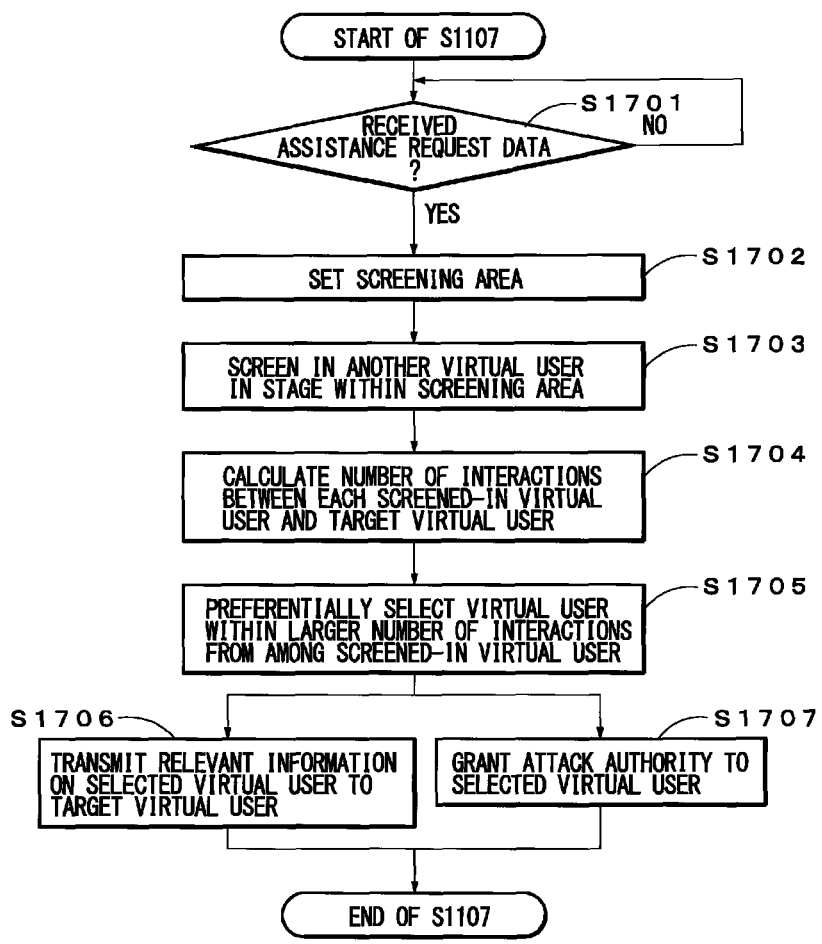
F I G. 17

| ID | POSITIONAL INFORMATION | LEVEL INFORMATION | NUMBER OF INTERACTIONS |
|---|---|---|---|
| 10234 | St4 | L21 | D |
| 10335 | St3 | L15 | B |
| 10255 | St5 | L2 | A |
| 10451 | St5 | L5 | C |
| 10221 | St6 | L12 | C |
| 10742 | St6 | L4 | D |
| 10654 | St1 | L8 | B |
| 10834 | St1 | L12 | |
| ⋮ | ⋮ | ⋮ | ⋮ |

F I G. 1 8 A

| ID | POSITIONAL INFORMATION | LEVEL INFORMATION | NUMBER OF INTERACTIONS |
|---|---|---|---|
| 10255 | St5 | L2 | A |
| 10834 | St1 | L12 | A |
| 10335 | St3 | L15 | B |
| 10654 | St1 | L8 | B |
| 10451 | St5 | L5 | C |
| 10221 | St6 | L12 | C |
| ⋮ | ⋮ | ⋮ | ⋮ |

F I G. 1 8 B

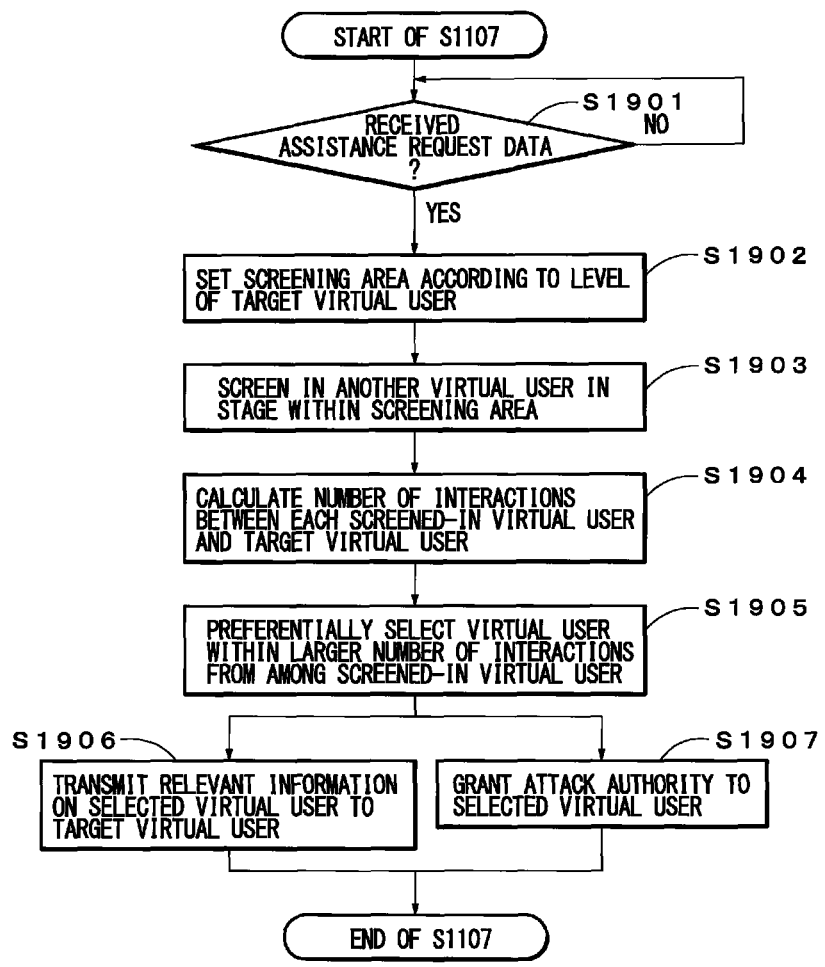
F I G. 1 9

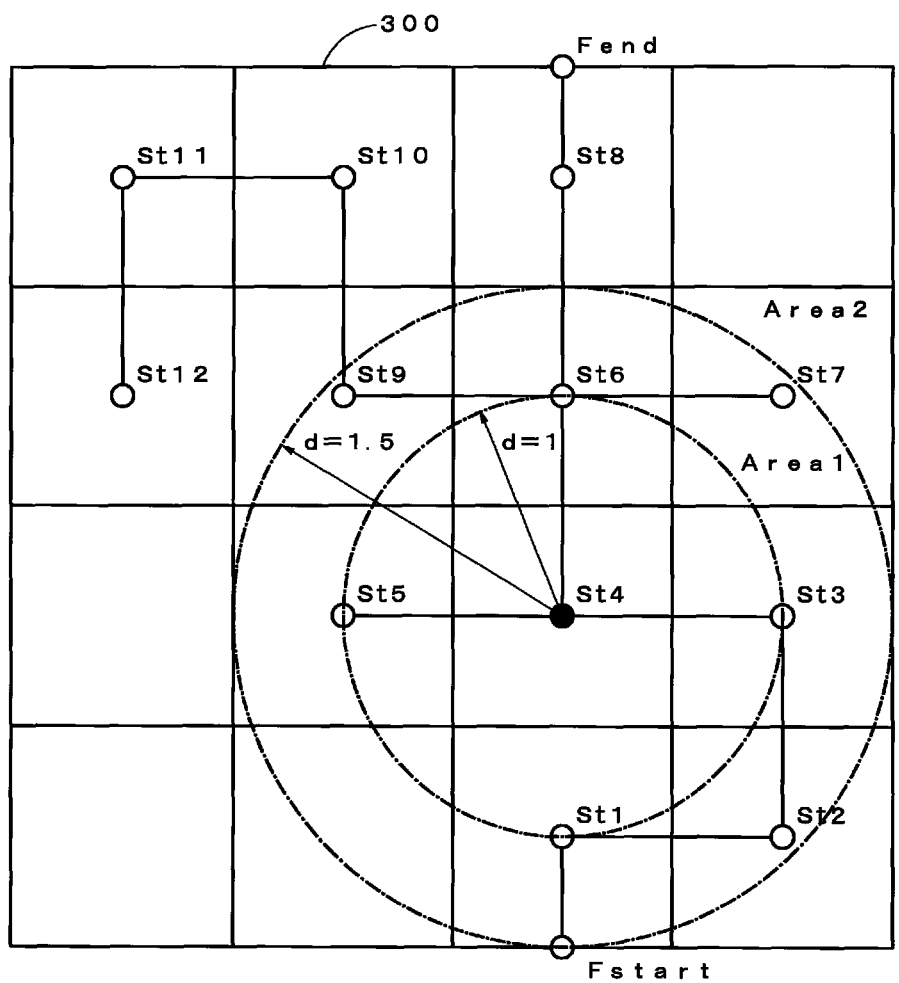
F I G. 20

GAME SERVER, GAME CONTROLLING METHOD THEREOF, NON-TRANSITORY COMPUTER-READABLE MEDIUM AND GAME SYSTEM

CROSS REFERENCE TO RELATED APPLICATIONS

This application claims the benefit of Japanese Patent Application No. 2012-140803 filed Jun. 22, 2012, which is hereby incorporated by reference in its entirety.

TECHNICAL FIELD

The present disclosure relates to a game server that manages an action of a virtual user existing in a virtual space using operation data from each terminal connected via a communication network, a game controlling method of controlling progression of a game offered by the game server, a non-transitory computer-readable medium and a game system.

BACKGROUND ART

Recently, social network games (hereinafter referred to as social games), which are games provided using a Social Networking Service (SNS), are becoming more common with the spread of high-end portable terminals such as smartphones. A social game is a game in which a physical user operating a terminal controls, via a communication network, a virtual user that exists in a virtual space established by a game server to play a game online while communicating with another virtual user existing in the same virtual space.

For example, one of such type of social games may be a game in which, depending on an action of the virtual user or a story, a single story or scenario is established by combining a plurality of game parts such as a quest part, a battle part, a combination part, and a gacha part to constitute a single game. The quest part may be a game part in which the virtual user acting in response to the operation of the terminal by the physical user sequentially completes events assigned to the virtual user in a quest including a battle or a mission (e.g., see Japanese Laid-Open Patent Publication No. 2012-24248).

Japanese Laid-Open Patent Publication No. 2012-24248 discloses that when a quest, which is one of the game parts, is selected, the virtual user therein linearly selects and completes the events assigned to the virtual user in the relevant quest in a predetermined order. For example, the events assigned to the virtual user include engagement in a battle with an enemy that has appeared in a virtual space. In this type of battle, assistance of another virtual user is available.

In the configuration of the conventional quest part, a plurality of virtual positions are arranged in a single straight path, in other words, one-dimensionally, and a virtual user is placed at each of the positions. Since a plurality of virtual positions are arranged one dimensionally in the conventional quest part, the positional relationship between one virtual user and another is not addressed. For instance, when one virtual user requests assistance from another virtual user in an attack against an enemy during a battle, a candidate for assistance is randomly selected regardless of the positional relationship between the virtual users. It is desirable to expand images of virtual space settings in the aforementioned conventional quest part by building a positional relationship between virtual users, e.g., by allowing one virtual user to send an assistance request to another based on their positional relationship in a virtual space.

The present disclosure has been contrived based on the aforementioned disadvantages and it is an object of the present disclosure to provide a game server that can provide a realistic world of a virtual space by constructing a positional relationship between one virtual user and another that can exist at virtual positions therein, whereby an interest in the entire game is stimulated. Also, it is an object of the present disclosure to provide a game controlling method of controlling the progression of a game provided by the game server, a non-transitory computer-readable medium, and a game system.

SUMMARY

The game server of the present disclosure includes a map data storing section that stores map data representing a two-dimensional map on which virtual positions where at least one virtual user can exist are arranged in a virtual space; a virtual position data table that stores identification data of the virtual user existing at each of the virtual positions; a display process data transmitting section that transmits display process data for displaying an image of the two dimensional map to a terminal connected via a communication network; an operation data receiving section that receives operation data from the terminal; a virtual user position changing section that changes the virtual position at which the virtual user exists to a virtual position of a destination when accumulated points consumed in accordance with a received content of the operation data is greater than or equal to points required for the virtual user to reach the virtual position of the destination; a data updating section that updates the identification data stored in the virtual position data table when the virtual position at which the virtual user exists is changed; and a relationship building section that, based on the virtual distance between virtual positions of a target virtual user controlled via a terminal (moved in the virtual space in accordance with operation of the terminal by the physical user) and another virtual user, transmits relevant information regarding the other virtual user to the terminal.

In the above-mentioned embodiment, the virtual position at which a virtual user can exist is located two dimensionally and stored as map data in the map data storing section, and this can be displayed on the terminal as an image of a two-dimensional map. Thereby, when executing an action assigned to the virtual user at each virtual position, a plurality of virtual destination positions reachable by the virtual user can be provided. Based on the virtual distance between the virtual positions of one virtual user and another, relevant information regarding the other virtual user can be transmitted. According to the present disclosure, a realistic world in a virtual space is provided based on the positional relationship between virtual users that can exist at virtual positions, thereby stimulating an interest in the entire game.

Particularly since the physical user who operates the terminal can recognize the plurality of destinations by looking at the two-dimensional map on the terminal, a virtual region provided by the game part can be broadened visually as compared to the related art in which merely linear advancement was possible.

In any of the embodiments described above, the game server of the present disclosure can be deemed to relate to a game control method for controlling the progression of a game provided by the game server, a non-transitory computer-readable medium or a game system.

In a preferred embodiment of the game server of the present disclosure, the relationship building section sets a screening area covering a predetermined distance from the virtual position of a target virtual user to another virtual user existing in the screening area. The relationship building section calculates the number of interactions that the other user has had with the target virtual user, which indicates the strength of the relationship therebetween. In turn, the relationship building section selects a virtual user with a larger number of interactions from among at least one other virtual user and transmits relevant information therefor.

According to the foregoing embodiment, the relationship building section sets a screening area for restricting another virtual user whose relevant information is transmitted. A relationship between the target virtual user and another virtual user existing at a virtual position a short distance away from the target virtual user can be built based on their actions.

In another preferred embodiment of the game server of the present disclosure, an attribute information storing section is further included. The attribute information storing section stores, as attribute information, the level, or skill, of each virtual user existing in a virtual space. The relationship building section selects, from among at least one virtual user other than a target virtual user existing at a virtual position in the screening area, a virtual user with a higher level and transmits relevant information regarding the virtual user thus selected.

According to the foregoing embodiment, the relationship building section selects a virtual user with a higher level—in other words, selects, from among at least one virtual user other than a target virtual user restricted with regard to the virtual distance, a user who can effectively assist the target virtual user in a battle against the enemy. The relationship building section can thereby present relevant information regarding the other virtual user thus selected to the terminal that is used to control the target virtual user.

In a preferred embodiment of a game server of the present disclosure, the relationship building section calculates the number of interactions between a target virtual user and each of the other virtual users existing at virtual positions in a screening area. The number of interactions, which indicates the strength of the relationship with the target virtual user, is calculated for each of the other virtual users. Another virtual user with a larger number of interactions is selected, and relevant information thereon is transmitted.

According to the foregoing embodiment, the relationship building section selects a virtual user with a larger number of interactions—in other words, selects, from among at least one other virtual user restricted with regard to the virtual distance, a user that can effectively assist the target virtual user in a battle against the enemy. Relevant information regarding the other virtual user thus selected can be presented to the terminal that is used to control the target virtual user.

In another preferred embodiment of the present disclosure, the game server further includes an attribute information storing section. As attribute information, the attribute information storing section stores the level, or skill, of each virtual user existing in a virtual space. The relationship building section sets the screening area to be larger as the level of a target virtual user improves and transmits relevant information regarding another virtual user existing at a virtual position in the screening area.

According to the foregoing embodiment, the relationship building section sets a larger screening area as the level of the target virtual user improves, thereby prompting improvement of the skill of the target virtual user.

In still another embodiment of the present disclosure, the game server further includes an enemy battle processing section. The battle processing section processes a battle between a target virtual user and an enemy having appeared at the virtual position of the target virtual user. An operation data receiving section receives, from the target virtual user, assistance request data for requesting another virtual user to assist in a battle against the enemy having appeared at the virtual position of the target virtual user. Upon reception of the assistance request data, the relationship building section transmits, to the target virtual user, relevant information regarding another virtual user who is a candidate for assistance.

According to the foregoing embodiment, the relationship building section selects, from among at least one other candidate virtual user restricted with regard to the virtual distance, a user available for assistance that can effectively assist the target virtual user in a battle against the enemy. Relevant information regarding the virtual user thus selected can be presented to the terminal that is used to control the target virtual user.

In yet still another embodiment of the game server of the present disclosure, the authority to attack an enemy battling with a target virtual user is granted by the battle processing section to another virtual user who is a candidate for assistance.

According to the foregoing embodiments, the assistance authority during the battle with the enemy is restricted based on the virtual distance, thereby lending variety to the game.

According to the present disclosure, relevant information regarding a virtual user other than a target virtual user is transmitted based on the virtual distance between the positions of the aforementioned users. As a result, a relationship therebetween can be built based on their actions, thereby lending variety to the game and stimulating an interest in the entire game.

BRIEF DESCRIPTION OF DRAWINGS

FIG. 2 is a diagram for explaining a configuration of a social game provided by a game server of the present disclosure.

FIG. 3 is a diagram showing a hardware configuration of the game server of the present disclosure.

FIG. 4 is a diagram showing a configuration of each processing section executed by the game server of the present disclosure.

FIG. 6 is a diagram for explaining a field indicated by a map stored in a map data storing section.

FIG. 9 is an explanatory diagram of a specific example of an attribute data table.

FIG. 11 is a flowchart for explaining content of a process executed by a quest part processing section.

FIG. 12 is a flowchart for explaining a specific process of changing a stage at which a virtual user exists.

FIG. 13 is a diagram showing a specific example of a destination stage selection image displayed on the touch panel of the terminal.

FIG. 14 is a flowchart for explaining specific content of a process of transmitting relevant information regarding another virtual user according to a first embodiment.

FIGS. 16A and 16B are explanatory diagrams of a specific example of relevant information regarding a virtual user according to the first embodiment.

FIG. 17 is a flowchart for explaining specific content of a process of transmitting relevant information regarding another virtual user according to a second embodiment.

FIGS. 18A and 18B are explanatory diagrams of a specific example of relevant information regarding another virtual user according to the second embodiment.

FIG. 19 is a flowchart for explaining specific content of a process of transmitting relevant information regarding another virtual user according to a third embodiment.

FIG. 20 is an explanatory diagram of a specific example of an area where another virtual user is screened in based on an improvement of a level.

DETAILED DESCRIPTION OF EMBODIMENTS

Further features of the disclosure will become apparent from the following detailed description of exemplary embodiments with reference to the attached drawings.

Figure 1:
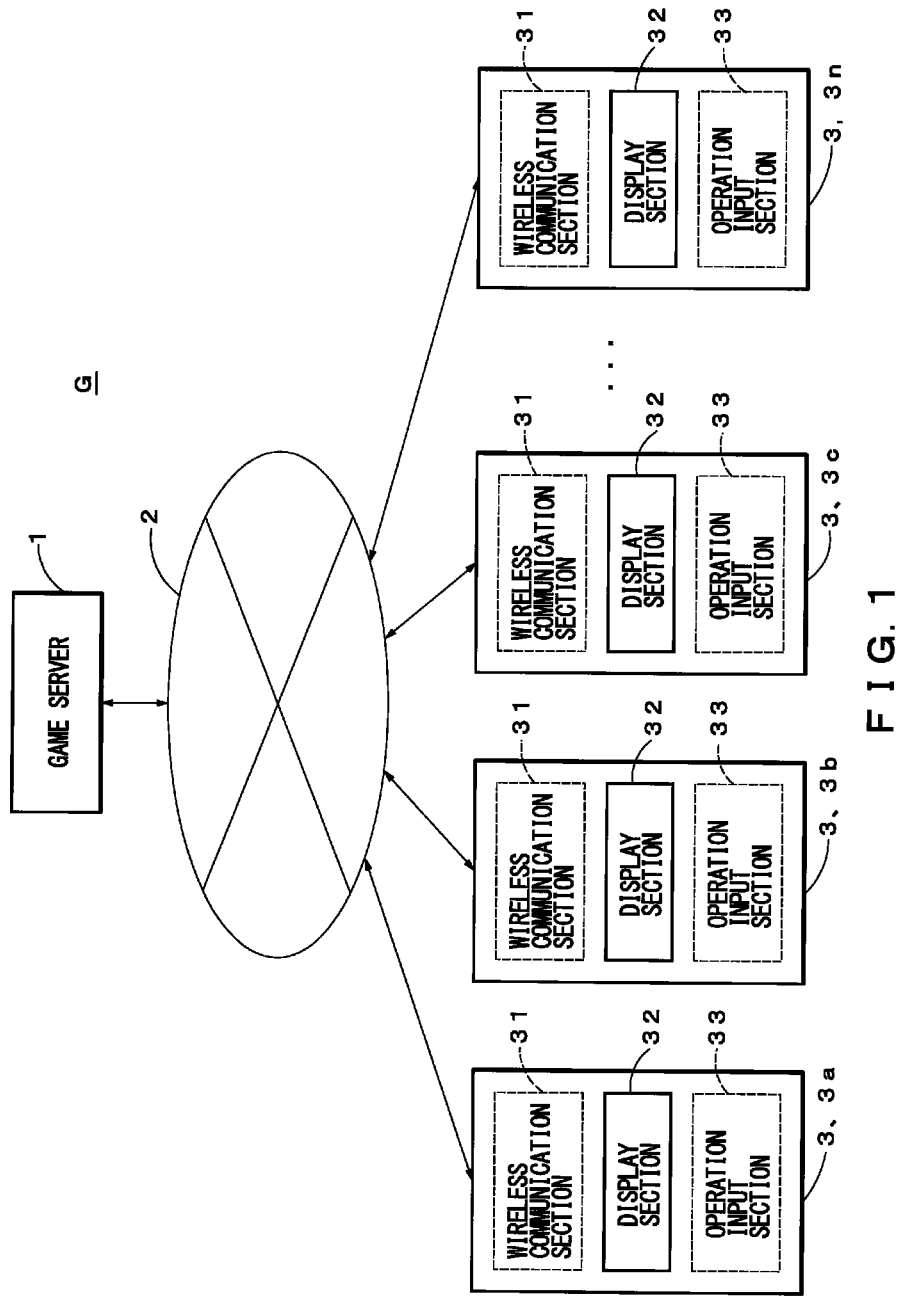
FIG. 1 is a diagram showing a system configuration of a game system of the present disclosure.

An embodiment for implementing the present disclosure (hereinafter referred to as the present embodiment) will now be described with reference to specific examples. The present embodiment relates to a game system that provides a game to a terminal connected to a game server via a communication network. Specifically, as shown in FIG. 1, a game system G of the present embodiment includes a game server 1 that provides a game to a physical user who is operating a terminal, and terminals 3a, 3b, 3c, . . . , 3n (hereinafter, collectively referred to as a terminal 3) connected to the game server 1 via a communication network such as the Internet 2.

In the following description, prior to describing the embodiment, the definitions of terms used in the present embodiment will be clarified. Then, a general outline of a social game concerning the present embodiment will be described, and thereafter, a configuration of the game system G and a process performed by the game system G will be described in detail.

(1) DEFINITIONS OF TERMS

The definitions of terms used in the present embodiment are as follows.

"Virtual space" means a virtual world that is created during a game based on content of the game and refers to a space different from a physical space. The "virtual space" displayed on a display (a display section) of the terminal 3 is two-dimensional. However, a conceptual space created by executing a program in the server 1 via a communication network with connections to another terminal 3 is not limited to a two-dimensional space.

"Physical user" means an entity operating a terminal, i.e., a person. "Virtual user" means a virtual entity representing the physical user in the virtual space in accordance with a button operation or a touch operation on the terminal of the physical user, or which is created based on a taste or preference of the physical user. Specifically, a virtual user is a virtual entity that acts in a virtual space in response to the physical user's operation of a terminal. The "virtual user" includes, for example, a virtual entity like a player in conventional shogi games or mahjong games that is not visible in the game and operates pieces or tiles in the virtual space as an existence representing the "physical user". The "virtual user" also includes a particular visible character that is displayed in the game such as a role playing game or a player-versus opponent game and that moves or performs an action. Further, the "virtual user" includes a virtual entity displayed as an avatar in a SNS. Accordingly, the "virtual user" in the present embodiment is used as a term that broadly represents the virtual entity in the virtual space, regardless of whether it is a virtual entity which is embodied in a game or a virtual entity which is not embodied.

"Two-dimensional map" means a map that is presented on a plane displayed on a display (a display section) of the terminal 3, and expresses a plurality of positions located on a plane in the virtual space and a route connecting the positions under a certain rule. "Virtual position" means a position on a plane located in such a manner that the virtual user is reachable.

"Point" means a point granted to the virtual user in the virtual space and allows a target game part to progress when the virtual user consumes the point in the virtual space. "Operation data that requests for a progress of a game part related to a virtual user" means operation data that requests that the point granted to the virtual user be used and that a target game part progress depending on the point consumed by being used. "Received content of operation data" means, for example, the number of times operation data is received, an instruction is indicated by the operation data, and a decision is indicated by the operation data.

(2) GENERAL OUTLINE OF SOCIAL GAME

Next, a general outline of a social game provided from the game server 1 to the terminal 3 connected via the Internet 2 will be described with reference to FIG. 2.

Generally, a social game is a game played in a virtual space by a virtual user performing an action in response to operation of the terminal 3 by the physical user. For example, the social game is a game in which a set of a predetermined number of cards (hereinafter, referred to as a card deck) is created from among various kinds of, e.g., several hundreds of kinds of, virtual cards (hereinafter, simply referred to as cards) each having a character displayed thereon. More specifically, the user strengthens and collects the cards by executing a battle against enemies appearing in the virtual space using the cards or by trading the cards with another virtual user, while upgrading a level and selecting an attribute of the card in the card deck. In a battle using the cards, damage to enemies and results of the battle are determined based on the level of offensive and defensive powers of each card constituting the card deck, a skill (corresponding to a "meld" as used in a card game or mahjong) with which a certain effect can be obtained by a predetermined combination of cards, and so on.

This type of social game is established as a single game and as a whole with a plurality of parts being combined organically to complete a single story or a character. For example, as shown in FIG. 2, a social game 20 includes a quest part 21, a combination part 22, a battle part 23, a gacha-part 24 and a trade part 25, each part serving as a game element.

As represented by the term "quest", which means "to search, to explore and to have an adventure" or the like, the quest part 21 is a part constituting a game that progresses as a virtual user quests in a virtual space, battles against enemies that appear during the quest, acquires a new card, and improves the level of the virtual user. In the quest part 21, the virtual user is given a predetermined number of quest points, and a movement of the virtual user, an acquisition of an item, an improvement of the level, and so on, are accomplished by consuming the quest point. In the quest part 21, a battle against an enemy that has appeared is executed by using the cards possessed by the virtual user and consuming a battle point.

The combination part 22 is a part in which cards possessed by the virtual user are combined to increase the strength of the cards, so as to increase an offensive power for damaging enemies or a defensive power for defending from enemies during a battle.

The battle part 23 is a part in which the cards possessed by the virtual user are used to launch a battle in which another virtual user acts as an opponent. A win or a loss is determined based on the offensive power and the defensive power of each of the cards described above.

The gacha part 24 is a part having a name that comes from a term "gacha-gacha" expressing the sound and manner in which a capsule toy, which is a toy enclosed in a capsule, is ejected from a toy vending machine when a coin is inserted into the toy vending machine, and, for example, in which the virtual user obtains a card randomly based on an occurrence rate for each card by using a gacha point or gacha authority that is virtually provided instead of a coin.

The trade part 25 is a part via which the virtual user exchanges the cards in possession with another virtual user. Each virtual user adds profitable cards obtained by using the trade part 25 into a card deck to strengthen the offensive power for damaging an enemy or the defensive power for defending from an enemy that is attacking during the battle.

The social game 20 including the plurality of parts described above is not independent from other game parts, and, as described above, each part is associated and combined with each other to become meaningful as an entire game. Therefore, with the social game 20, a single game can be progressed as an entirety with the virtual user causing each game part to progress effectively.

(3) BASIC HARDWARE CONFIGURATION (3-1) Configuration of Terminal

Hereinafter, a hardware configuration for obtaining a game system G of the present embodiment will be described based on the definition of the social game 20 described above.

As shown in FIG. 1, the terminal 3 may be a portable wireless communication terminal, and may include, for example, a wireless communication section 31, a display section 32, and an operation input section 33. The wireless communication section 31 is connected to the Internet 2 over a mobile telephone line or a wireless LAN circuit and performs data communication with the game server 1 by using a web browser. The display section 32 displays a web browser data screen received from the game server 1. The operation input section 33 comprises a touch panel. For example, an operation input from the physical user in accordance with a screen display of the display section 32 is accepted via the touch panel. The operation input thus accepted from the physical user is transmitted to the game server 1 by the wireless communication section 31.

With the terminal 3 having such a hardware configuration, for example, an individual authentication process of the terminal is performed using a combination of a pre-registered user ID and a predetermined password. When the authentication between the terminal 3 and the game server 1 is completed, the terminal 3 receives, from the game server 1, data necessary for progression of a game and transmits operation data of the operation input section 33 to the game server 1.

The terminal 3 may be a mobile telephone, a PDA or a personal computer as long as it is a communication device capable of communicating with the game server 1 via a communication network such as the Internet 2. The operation input section 33 has been described by taking a touch panel as an example, but may be of a configuration in which information is input by performing a selection operation by moving a cursor with a physical key operation.

(3-2) Schematic Configuration of Game Server

The game server 1 to be connected to the terminal 3 so as to be capable of communicating with the terminal 3 is embodied as a computer having a general-purpose hardware configuration as shown in FIG. 3, for example. That is to say, as shown in FIG. 3, the game server 1 includes a communication interface section 11 that establishes communications with the terminal 3 via the Internet 2, and an operation input unit 12 such as a keyboard or a mouse that accepts an operation input from a physical user. Further, the game server 1 is provided with an arithmetic processing section 13 such as a CPU that executes various arithmetic processing, a main memory 14 such as an SRAM or a DRAM that temporarily stores arithmetic processing data, a storage unit 15 such as a hard disk in which application programs and various data are stored, and a display 16 that displays an outcome of the arithmetic process.

In the game server 1, by installing a program in the storage unit 15 for offering such social game 20 to a physical user, function blocks as shown in FIG. 4 are obtained.

That is to say, in the game server 1, for example, as shown in FIG. 4, a game data processing section 100 comprising a quest part processing section 101, a combination part processing section 102, a battle part processing section 103 and a gacha part processing section 104 as well as a game data storing section 200 that manages game data, thus realizing the functions of the abovementioned sections.

Here, the quest part processing section 101 executes data processing for the quest part 21. The combination part processing section 102 executes data processing for the combination part 22. The battle part processing section 103 executes data processing for the battle part 23. The gacha part processing section 104 executes data processing for the gacha part 24. The trade part processing section 105 executes data processing for the trade part 25.

(3-3) Specific Architecture of Game Server

Figure 5:
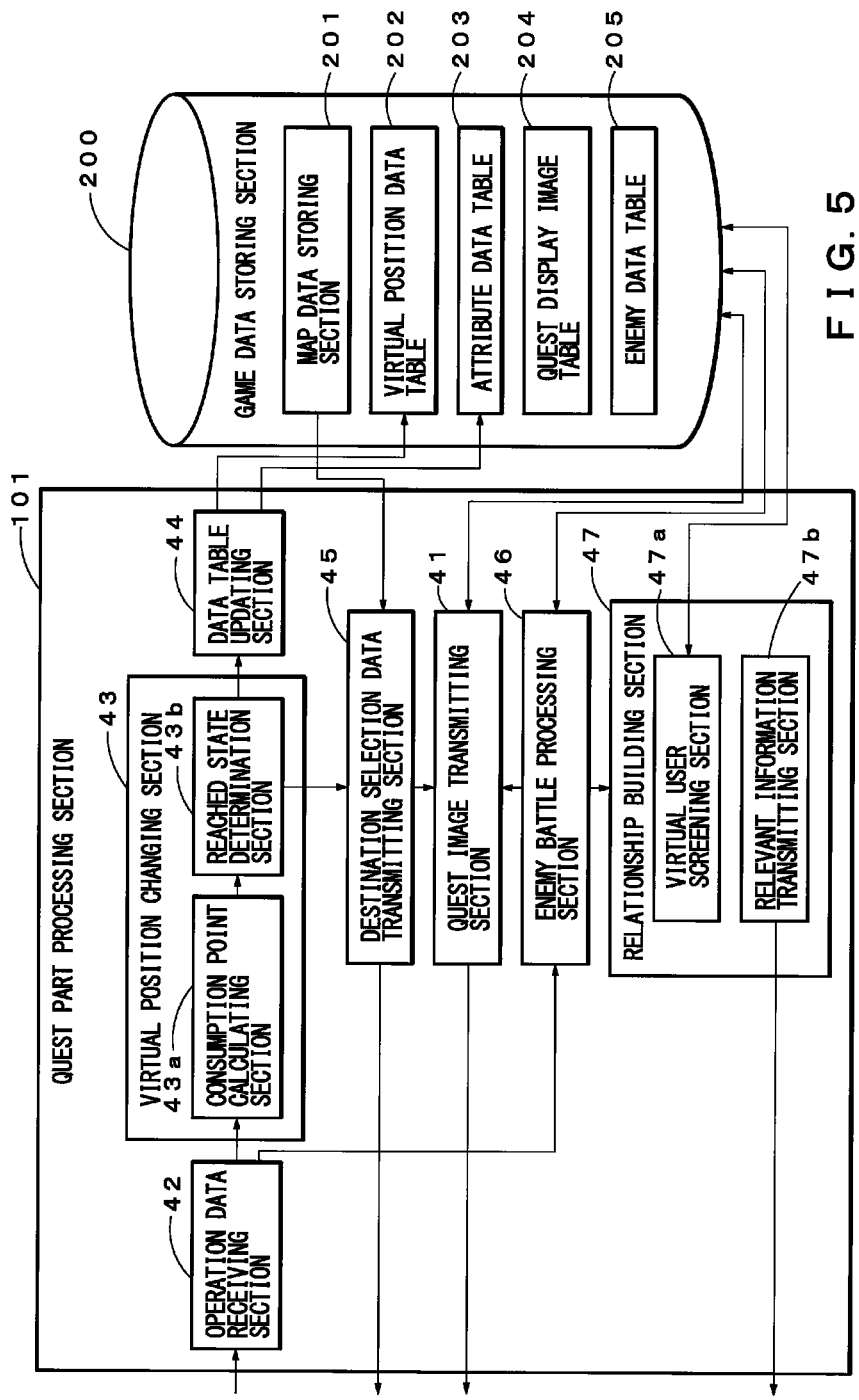
FIG. 5 is a diagram showing a specific process of a quest part.

Now, among the parts processed by this type of game server 1, a specific configuration and process details of achieving the quest part 21 will be described with reference to FIG. 5.

(3-3-1) Configuration of Game Data Storing Section

Data to be used in the quest part 21 is stored in the game data storing section 200. As shown in FIG. 5, in a map data storing section 201, a virtual position data table 202, an attribute data table 203, a quest display image table 204, and an enemy data table 205 are stored.

The map data storing section 201 stores map data of a two-dimensional map in a virtual space, which presents arrangement of virtual positions where a virtual user can exist. The map data is used to identify a virtual position where a virtual user exists and a virtual position that the virtual user can reach by consuming a quest point.

In the present embodiment, a field 300, which is shown in FIG. 6, is explained as a specific example of a two-dimensional map. The field 300 is divided into a matrix of a plurality of sub-regions (here, divided into equal squares each having a virtual side length of "1"). Stages St1 to St12 are assigned to twelve of the sixteen sub-regions, and a route running through each of the twelve stages is drawn to complete the field 300. As shown in FIG. 6, the route originates from a starting point Fstart, runs through St1, St2, St3, St4, St6, and St8, and reaches an endpoint Fend. At stages St4 and St6, the route is bifurcated. The route is configured such that it is possible to reach a plurality of different stages from these two stages.

Figure 7:
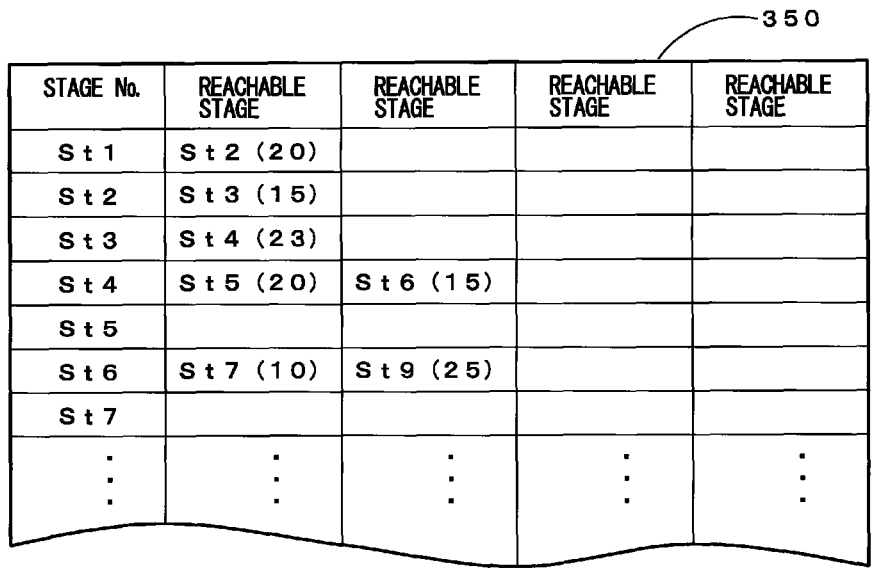
FIG. 7 is a diagram for explaining a specific example of map data.

To configure the field 300, the map data storing section 201 stores map data 350 shown in FIG. 7. The map data 350 contains, as shown in FIG. 7, data illustrating a connection relationship between a total of twelve stages, stages St1 to St12, that are arranged at virtual positions in a virtual space as a single field. In the map data 350 represented by the table in FIG. 7, Reachable Stage "St2(20)" for Stage Number "St(1)" indicates that Stage St(2) can be reached from Stage St(1) by consuming "20" quest points, which will be described below. Similarly, Reachable Stage "St5(20)" for Stage Number "St(4)" indicates that Stage St(5) can be reached from Stage St(4) by consuming "20" quest points, and Reachable Stage St "St6(15)" indicates that Stage St(6) can be reached from Stage St(4) by consuming "15" quest points. The map data storing section 201 stores the map data 350 containing such information for each field.

In the above description, "stage" is an example of a virtual position. When the virtual user reaches this stage, the user acquires an item or a card or battles with an enemy that has appeared. "Field" is a single closed virtual space having a plurality of such "stages" arranged therein. The entire quest part is constituted by additionally providing a plurality of such fields, each having stages arranged therein. The terms "stage" and "field" used herein are merely distinguished for the sake of convenience. For example, the term "field" may be used for a position at which the virtual user can exist in the virtual space based on a story in a game and the term "stage" may be used for a single closed virtual space at which the "field" is located, which is opposite to the definition of the present embodiment.

Figure 8:
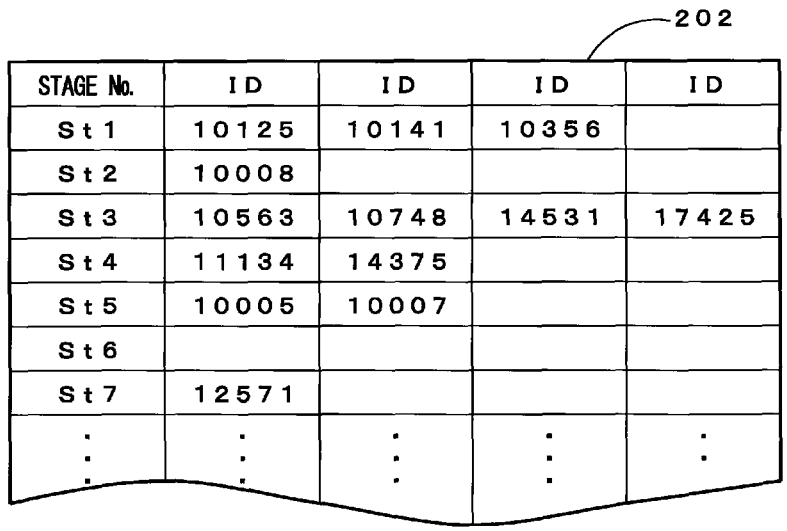
FIG. 8 is an explanatory diagram of a specific example of a virtual position data table.

The virtual position data table 202 (see FIG. 5) stores identification data of the virtual user existing at each virtual position, as shown in FIG. 8, for example. The virtual position data table 202 is, for example, used for understanding which virtual user exists at each virtual position and the total number of the virtual users. Specifically, as identification data, the virtual position data table 202 stores an identification number ID for a virtual user that exists at each of St1 to St8, such as information regarding virtual users with identification numbers ID "11134" and "14375" that exist at Stage St4.

The attribute data table 203 (see FIG. 5) contains attribute information regarding virtual users existing in the virtual space for each virtual user. For example, as shown in FIG. 9, the attribute data table 203 contains, for each virtual user, attribute information including position information, level information, quest point information, battle point information, gacha point information and acquisition card list information.

In the attribute data table 203, "Position Information" indicates a virtual position at which a virtual user exists. For example, Position Information "St(3)" indicates that a virtual user exists at Stage St(3) in the field 300 shown in FIG. 6. "Level Information" is a numerical value representing a skill level of a virtual user in the game. When the game starts from level 1, this numerical value increases with the progress of the game to, for example, Level 2 and Level 3. For example, Level Information "L6" indicates that the level of the virtual user is at a sixth level.

Concerning this level, a single level is given in the entire game, rather than giving a unique level for the quest part, which is only one part of the game. Also, depending on the game, it may not be necessary for the virtual user to have a concept of a level.

"Quest Point" information indicates the number of points consumed as a cost in the quest part 21 when the virtual user moves between the stages while questing in the virtual space. "Battle Point" information indicates the number of points consumed as a cost when a virtual user battles against another virtual user in the battle part 23, or when attacking an enemy that has appeared when questing in the virtual space in the quest part 21. "Gacha Point" information indicates a point consumed as a cost when the virtual user performs a gacha action to obtain an item in the gacha part 24. "Acquired Card List" information indicates a list of cards acquired by the virtual user.

Figure 10:
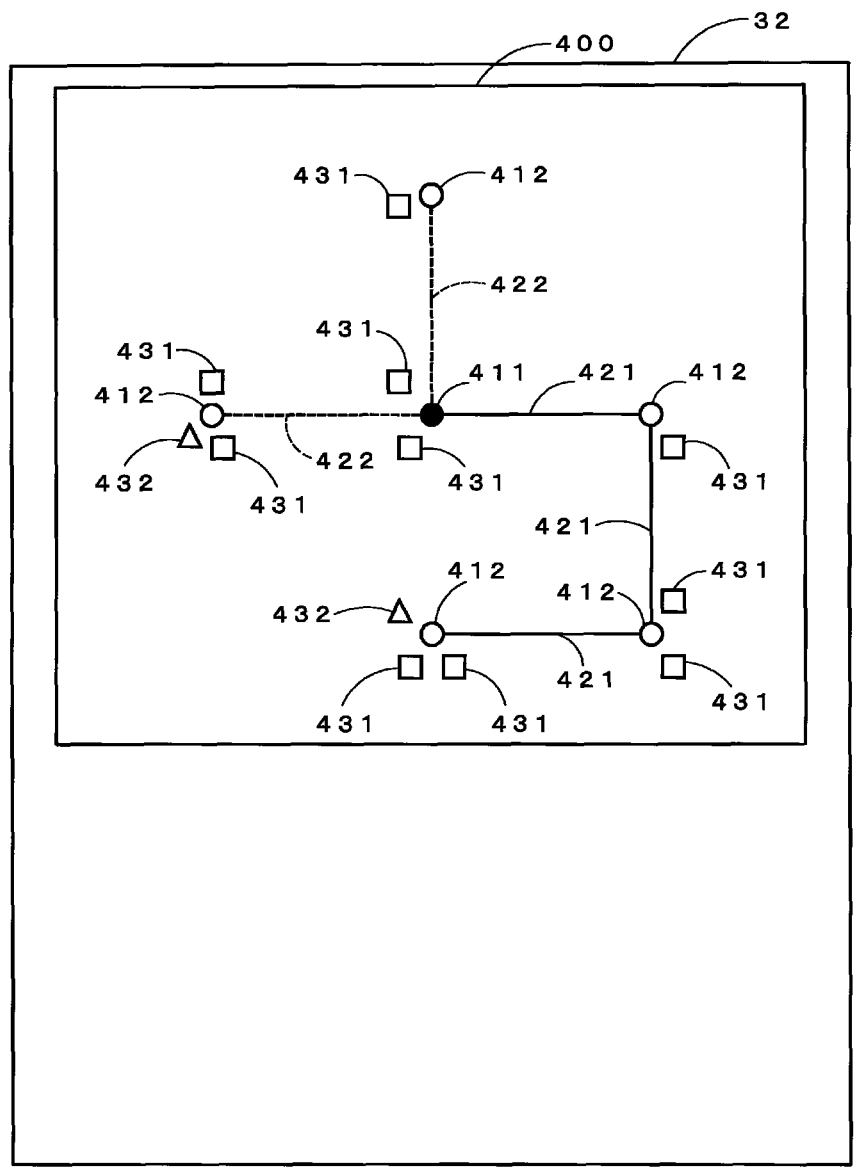
FIG. 10 is a diagram showing a specific example of an image of a map displayed on a touch panel of a terminal.

The quest display image table 204 (see FIG. 5) contains data for displaying an image of the map on the terminal 3 connected via the Internet 2. Specifically, as has been described with reference to FIG. 6, when the virtual user exists at Stage St(4) of the field 300, in order to present a map image 400 as shown in FIG. 10, the quest display image table 204 contains display image data described below.

That is to say, the quest display image table 204 contains data for displaying a stage display image 411 (a black dot in FIG. 10) that indicates a stage at which the virtual user actually exists, e.g., Stage St (4), and data for displaying a stage display image 412 (a white dot in FIG. 10) that indicates a stage around Stage St (4). The quest display image table 204 also contains data for displaying an already-reached display image 421 that indicates a route (shown by a solid line in FIG. 10) between the already-reached stages and data for displaying an unreached display image 422 that indicates a route (shown by a broken line in FIG. 10) between the unreached stages.

Further, the quest display image table 204 contains data for displaying a virtual user display image 431 (a white square in FIGS. 10) and 432 (a white triangle in FIG. 10) that indicates whether or not another virtual user in each stage is an ally. Also, the quest display image table 204 stores image data for describing a battle with an enemy stored in the enemy data table 205.

The enemy data table 205 stores information regarding an enemy appearing in a stage. Specifically, the enemy data table 205 stores hit point parameter data on the strength, the durability, and like factors of each enemy as well as capability parameters indicating offensive and defensive capability values.

(3-3-2) Configuration of Quest Part Processing Section

The specific configuration of the quest part processing section 101 will now be described. As shown in FIG. 5, the quest part processing section 101 includes a quest image transmitting section 41, an operation data receiving section 42, a virtual position changing section 43, a data table updating section 44, a destination selection data transmitting section 45, an enemy battle processing section 46, and a relationship building section 47.

The quest image transmitting section 41 transmits data for displaying an image of a map to each terminal 3 connected via the Internet 2 based on data stored in the game data storing section 200. Specifically, based on data stored in the game data storing section 200, the quest image transmitting section 41 retrieves each display image data stored in the quest display image table 204. Then, the quest image transmitting section 41 combines the display image data retrieved from the quest display image table 204 and transmits, to the terminal 3, the aforementioned display processing data for displaying an image shown in FIG. 10. Also, the display process data transmitted by the quest image transmitting section 41 is not limited to image data, but may also be display control data for controlling the display of the image data stored on the terminal 3 side.

The operation data receiving section 42 receives, from each terminal 3, operation data representing, for example, an operation that requires progress in the quest part. Specifically, the operation data receiving section 42 receives operation data indicating that a quest point is used for moving between the stages and operation data indicating that a battle point is used for battling against an enemy that has appeared.

The virtual position changing section 43 has a consumption point calculating section 43a and a reach determination section 43b for changing the stage at which each virtual user exists based on the operation data indicating that a quest point received by the operation data receiving section 42 is used.

The consumption point calculating section 43a calculates accumulated quest points consumed depending on the content of the received operation data. Specifically, the consumption point calculating section 43a calculates accumulated quest points consumed depending on the number of times the operation data is received. The reach determining section 43b determines whether the virtual user to be controlled or processed (hereinafter abbreviated as a target virtual user) reaches a destination virtual position based on the accumulated quest points. Also, in the present embodiment, the number of times the operation data is received is used as a specific example of the content of the operation data received, but an instruction represented by the operation data and a decision indicated by the operation data may also be used.

The data table updating section 44 updates identification data in the virtual position data table 202 when the stage at which each virtual user exists is changed by the virtual position changing section 43.

The destination selection data transmitting section 45 transmits, to the terminal 3, data related to options for selecting a destination stage.

The enemy battle processing section 46 performs a process of a battle of a specific virtual user with an enemy. In this process, the specific virtual user is a target virtual user, and the target virtual user accidentally encounters an enemy and uses at least one card in his/her own possession to engage in a battle with an enemy. Also, the enemy battle processing section 46 performs a process for involving, in a battle with an enemy, another virtual user who has received an assistance request from the target virtual user.

The relationship building section 47 comprises a virtual user screening section 47a and a relevant information transmitting section 47b. The relationship building section 47 is a means for building a relationship between a target virtual user and another virtual user based on the distance therebetween in a virtual space. Specifically, when a target virtual user and another virtual user exist on the same two-dimensional map, the aforesaid other virtual user is screened in by the virtual user screening section 47a based on his/her distance from the target virtual user. Relevant information regarding the other virtual user thus screened in is retrieved from the attribute data table 203 by the virtual user screening section 47a. The relevant information transmitting section 47b transmits the aforesaid relevant information to the terminal 3, which controls the screened-in target virtual user. Specifically, upon reception of an assistance request from a target virtual user battling with an enemy, the virtual user screening section 47a identifies relevant information regarding another virtual user who is a candidate for assistance, and the relevant information transmitting section 47b transmits the information to the terminal of the target virtual user. Relevant information regarding another virtual user, which is selected based on the virtual distance as described in the specific examples below, may be transmitted to the target virtual user, not only upon sending an assistance request therefrom, but also while the target virtual user is moving between stages in the quest part. The relationship building section 47 may transmit information to each terminal 3 operating another virtual user selected as a candidate for assistance so as to notify that the other virtual user is requested to launch an attack against the enemy battling with the target virtual user.

(4) PROCESS IN GAME SERVER (4-1) Process of Quest Part Processing Section

A content of processing of the quest part processing section 101 having the aforementioned configuration will be described with reference to FIG. 11.

In step S1101, the operation data receiving section 42 determines whether or not operation data that uses the quest point has been received. If the operation data that uses the quest point has not been received, the process returns to step S1101 (S1101: NO). If the operation data that uses the quest point has been received (S1101: YES), the process advances to steps S1102 and S1103.

In step S1102, the quest part processing section 101 performs a process of changing the position of existence in the field subject to processing, which will be described in detail below, and the process of this step ends.

In step S1103, the enemy battle processing section 46 selects, at a predetermined probability, an enemy from among those stored in the enemy data table 205 randomly and makes the selected one appear in front of a target virtual user in such a way that the selected enemy encounters the target virtual user by accident. If the enemy battle processing section 46 makes the selected enemy appear in front of the target virtual user (S1103: YES), the process advances to step S1104. If not (S1103: NO), the process returns to step S1101.

In step S1104, the enemy battle processing section 46 grants the target virtual user an opportunity to battle with the enemy having made an appearance in S1103. Specifically, the information stating that the target virtual user has been granted such an opportunity is notified from the enemy battle processing section 46 to the quest image transmitting section 41, which in turn transmits the notified information to the terminal 3.

At the terminal 3, to which the aforementioned notified information has been transmitted, whether a battle with the enemy will take place is determined. If a battle is to take place, operation data for battling with the enemy is transmitted to the game server 1.

In S1105, the enemy battle processing section 46 determines whether the operation data receiving section 41 has received the operation data for battling with the enemy from the terminal 3—in other words, whether to launch a battle with the enemy. If a battle is to be launched (S1105: YES), the process advances to steps S1106 and S1107. If no battle is to take place (S1105: NO), the process ends.

In step S1106, upon confirmation that a battle point has been used by the operation data, the enemy battle processing section 46 decreases, based on the card deck that the virtual user owns, the hit point of the enemy when the enemy is damaged. Likewise, as described below, the terminal 3, which controls another virtual user selected as a candidate for assistance, triggers use of a battle point by the operation data, and the enemy battle processing section 46 damages the enemy.

When the hit point of the enemy decreases to zero due to the damage done by the virtual user, the enemy battle processing section 46 outputs the result that the target virtual user has won the battle with the enemy and ends the process of this step. This result is stored in the attribute data table 203 as attribute data of the target virtual user, for example, and notified by the quest image transmitting section 41 to the terminal 3, through which the target virtual user is controlled.

In step S1107, the relationship building section 47 builds a relationship between the target virtual user with another virtual user based on the distance therebetween in a virtual space. The relationship building section 47 transmits relevant information regarding another virtual user, which is a candidate for assistance during a battle with the enemy, to the terminal 3, which controls the target virtual user. The process ends thereafter.

(4-1-1) Process of Changing Stage where Virtual User Exists

As a specific process in step S1102, the quest part processing section 101 executes a process of changing a stage on which the virtual user exists in accordance with the flowchart shown in FIG. 12. As a prerequisite of this process, it is assumed that the destination stage of the target virtual user that is a target of the process has been determined. Also, it is assumed that each time the operation data that performs a usage request of the quest points is received from the terminal 3, the quest points of the target virtual user will decrease by "3" points. For example, the quest points to be consumed at a time may be set by the level of the target virtual user rather than being determined by the physical user operating the terminal 3.

In step S1201, the consumption point calculating section 43a calculates accumulated quest points consumed depending on the number of times the operation data is received. For example, when the operation data is received eight times, as has been described above, since the quest points are consumed by "3 points" each time the operation data is received, the accumulated consumed quest points become "24". Also, the consumption point calculating section 43a notifies the data table update section 44 of the quest points consumed for each time the operation data is received. The data table updating section 44 updates the quest points in the data of the target virtual user in the attribute data table 203 based on the information notified by the consumption point calculating section 43a. For example, when the target virtual user possesses "70" quest points and the operation data is received once, the data table update section 44 updates the quest point possessed by the target virtual user to "67 points", which is a reduction of "3 points" from "70 points".

In step S1202, the reach determining section 43b determines whether or not the accumulated quest points calculated by the consumption point calculating section 43a is greater than or equal to the points required for the target virtual user to reach the virtual destination position. For example, when the target virtual user moves from Stage St(3) to Stage St(4), the reach determining section 43b determines that "24 points", which is the accumulated quest points, is greater than or equal to "23 points", which is the number of points required for reaching the virtual destination position as shown in the table of FIG. 7. When the accumulated quest points is less than the required points (S1202: NO), the reach determining section 43b returns to step S1101, as shown in FIG. 11. When the accumulated quest points is greater than or equal to the required points (S1202: YES), the process proceeds to step S1203. Also, as has been described above, when the accumulated quest points is "24 points" and the required number of points is "23 points", the difference "1 point" can be assumed to have not been consumed and the quest points of the target virtual user in the attribute data table 203 may be changed by the data table update section 44.

In step S1203, the reach determining section 43b changes the stage where the target virtual user exists to the destination stage. Then, the data table updating section 44 is notified of the fact that the stage has changed.

In step S1204, the data table updating section 44 updates the identification data in the virtual position data table 202, and the process proceeds to step S1205. Specifically, the data table updating section 44 deletes the identification data of the target virtual user from the stage at which the target virtual user existed before the change, and adds the identification data of the target virtual user to the stage where the target virtual user exists after the modification.

In step S1205, the destination selection data transmitting section 45 determines whether there are a plurality of stages that the target virtual user can reach from the current stage of the target virtual user, which has been changed by the virtual position changing section 43. For example, when the target virtual user exists at Stage St(4) or St(6) of the field 300 shown in FIG. 6, it is determined that there are a plurality of reachable stages (S1205: YES), and the process proceeds to step S1206. When the target virtual user exists at a stage other than Stages St(4) and St(6), it is determined that a plurality of reachable stages do not exist (S1205: NO), and the process proceeds to step S1207.

In step S1206, the destination selection data transmitting section 45 transmits destination selection data for selecting the stage of the destination to the terminal 3 that controls the target virtual user, and the process ends.

For example, when the target virtual user exists at Stage St(4) as shown in FIG. 13 (see black dot in FIG. 13), the destination selection data transmitting section 45 transmits selection image data 510, 520 for selecting one of Stages St(5) and Stage St(6) as a destination. This selection image data 510, 520 may be incorporated in a map image 400 to be displayed on the terminal 3.

The terminal 3 which has received such selection image data 510, 520 displays these selection images on the display section 32. When one of the selection images is selected by the physical user operating the operation input section 33, the terminal 3 notifies the game server 1 of the fact that the destination stage has been determined via the wireless communication section 31.

In step S1207, the destination selection data transmitting section 45 determines the destination stage of the target virtual user, and the process ends. For example, when the target virtual user exists at Stage St(2) in the field 300 in FIG. 6, the destination selection data transmitting section 45 determines Stage St(3) as a destination stage.

(4-1-2) Process of Transmitting Relevant Information Regarding Another Virtual User by Relationship Building Section The processes of first to third embodiments, which are presented below, are explained as specific processes of step S1107.

First Embodiment

As a specific process of step S1107, the relationship building section 47 performs a transmission process of the first embodiment in accordance with the flowchart presented in FIG. 14.

In step S1401, the relationship building section 47 determines whether assistance request data is received from the terminal 3 that controls a target virtual user. When not received (S1401: NO), the process returns to step S1401. When received (S1401: YES), the process proceeds to step S1402.

Figure 15:
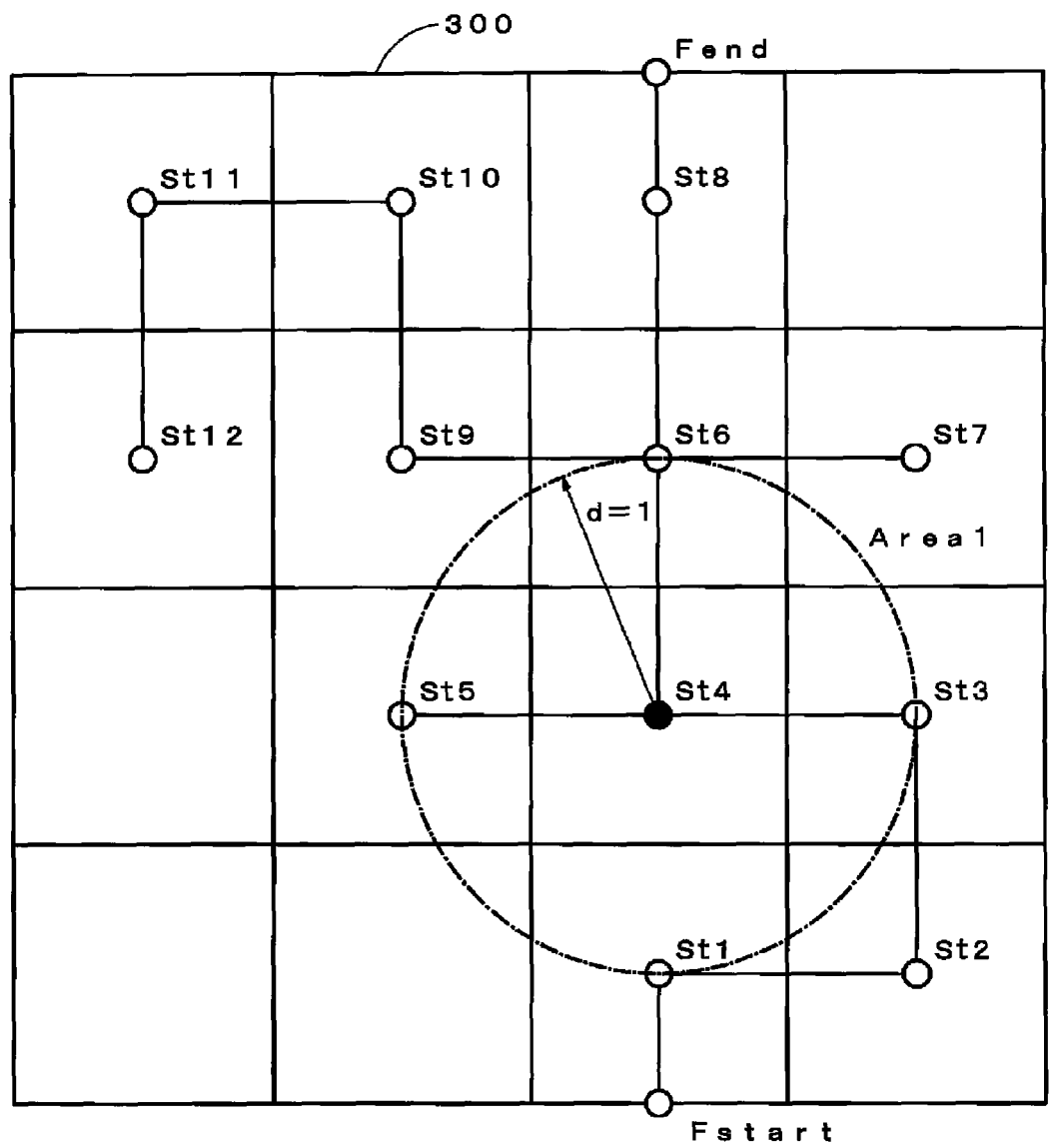
FIG. 15 is an explanatory diagram of a specific example of an area where another virtual user is screened in based on a virtual distance.

In step S1402, the virtual user screening section 47a sets a screening area where a virtual user other than the target virtual user is screened in. Specifically, the virtual user screening section 47a sets a screening area covering the stage of the target virtual user and another stage that is within a predetermined distance from the stage of the target virtual user. In this embodiment, for example, a circular area, Area 1, is indicated by a broken line in FIG. 15. As shown in Area 1, when the target virtual user exists at Stage St4, stages St1, St3, St4, St5, St6, which are within a distance d of "1" from Stage St4, are set to be in the screening area.

In step S1403, the virtual user screening section 47a screens in other virtual users at the stages within the screening area which are listed in the table of FIG. 16A, for example.

In step S1404, the virtual user screening section 47a arranges, in a descending order of the level, the other screened-in virtual users, as shown in the table of FIG. 16B, and selects a screened-in virtual user with a higher level. Subsequently, the process proceeds to step S1405 and step S1406.

In step S1405, the relevant information transmitting section 47b transmits certain items of the relevant information regarding the other virtual user thus selected—namely, the current stage and level of the selected virtual user shown in the table of FIG. 16B—to the terminal 3 that controls the target virtual user. Based on the transmitted relevant information, the terminal 3, through which the target virtual user is controlled, can acknowledge the type of the virtual user that can be requested for assistance. Via the game server 1, the terminal 3 that is used to control the target virtual user may, in order to request assistance, directly transmit a message to the virtual user selected as a candidate for assistance.

In step S1406, the enemy battle processing section 46 grants authority to attack the enemy battling with the target virtual user to the other virtual user selected as a candidate for assistance in step S1404. In turn, the relevant information transmitting section 47b transmits information to each terminal 3 that is used to control the other selected virtual user to inform that the selected user is a candidate for assistance to which the aforementioned authority can be granted. By means of the terminal 3 through which the virtual user selected as a candidate for assistance is controlled, whether to launch an attack based on the transmitted information is determined.

In this way, according to the distances between the virtual positions of the target virtual user and other virtual users, the relationship building section 47 imposes a restriction on the other virtual users screened in as candidates for assistance. Specifically, the relationship building section 47 differentiates and restricts virtual users available for assistance and virtual users not available therefor with regard to the virtual distance from the target virtual user to each of the other virtual users. The target virtual user can build a relationship with the other virtual users based on their actions. As a result, interest in the entire game can be stimulated.

A high-level virtual user is expected to do significant damage to the enemy during the battle. The relationship building section 47 selects a virtual user with a higher level—in other words, selects, from among at least one candidate virtual user restricted with regard to the virtual distance, a user available for assistance who can effectively assist the target virtual user in a battle against the enemy. In turn, to the terminal 3 that is used to control the target virtual user, the relationship building section 47 presents relevant information regarding the selected virtual user.

Second Embodiment

Another specific transmission process of step S1107, which is executed by the relationship building section 47 according to the second embodiment, is different from the aforementioned specific process of the first embodiment and is performed according to the flowchart shown in FIG. 17. Steps S1701 to S1703, S1706, and S1707 of the second embodiment are not explained hereinbelow since these steps are the same as steps S1401 to S1403, S1405, and S1406 of the first embodiment. In the transmission process according to the second embodiment, virtual users existing in stages of the screening area are screened in step S1703. Thereafter, the process proceeds to step S1704.

In step S1704, the other virtual users screened in by the virtual user screening section 47a are listed as shown in, e.g., the table of FIG. 18A. After the strength of the relationship is calculated and 6-level ratings—i.e., SS, S, A, B, C, and D in a descending order—are given to the virtual users, the process proceeds to step S1705. The strength of the relationship is, as described above, used as a criterion to determine the level of interaction between the target virtual user and another virtual user. For example, this determination is made based on the cumulative number of times in which the other virtual user has accepted a request for assistance from the target virtual user as well as on the cumulative number of messages exchanged therebetween—i.e., the number of exchanges therebetween that are conducted by selecting an optional means prepared in advance, such as the "Poke" or "Like" button.

In step S1705, the virtual user screening section 47a selects, from among at least one of the other screened-in virtual users shown in the table of FIG. 18B, a user with a larger number of interactions, and the process proceeds to steps S1706 and S1707.

The relevant information transmitting section 47b differentiates a virtual user available for assistance and a virtual user not available therefor with regard to the virtual distance from the target virtual user to each of the other virtual users. The target virtual user can build a relationship with the other virtual users based on their action. As a result, an interest in the entire game can be stimulated.

A virtual user communicating many times with the target virtual user is expected to be involved in an attack against the enemy during the battle, compared with a user having had a small number of interactions with the target virtual user. According to the second embodiment, the relationship building section 47 preferentially selects a virtual user with a larger number of interactions—in other words, selects, from among at least one other candidate virtual user restricted with regard to the virtual distance, a user available for assistance that can effectively assist the target virtual user in a battle against the enemy. In turn, to the terminal 3 that is used to control the target virtual user, the relationship building section 47 presents relevant information regarding the selected virtual user.

Third Embodiment

Another specific transmission process of step S1107, which is executed by the relationship building section 47 according to the third embodiment, is different from the aforementioned specific processes of the first and second embodiments and is performed according to the flowchart shown in FIG. 19. Step S1901 and steps S1903 to S1907 of the third embodiment are not explained hereinbelow since these steps are the same as step S1701 and steps S1703 to S1707 of the second embodiment. In the transmission process according the third embodiment, assistance request data is received in step S1901. Thereafter, the process proceeds to step S1902.

In step S1902, as the level of the target virtual user improves, the virtual user screening section 47a increases the size of the screening area where virtual users other than the target virtual user exist.

For example, in the third embodiment, two different screening areas are set according to the level of the target virtual user. Specifically, the virtual user screening section 47a sets the circular area—i.e., Area 1 indicated by a broken line in FIG. 20, as a screening area when the level of the target virtual user is L1 to L10. When the level is L11 or higher, the virtual user screening section 47a sets Area 2, which is a circular area larger than Area 1, as a screening area.

When the target virtual user exists at stage St4, the virtual user screening section 47a screens stages in the following manner: In order to set Area 1 as a screening area, stages St1, St3, St4, St5, and St6, which are within a distance d of "1" from the stage of the target virtual user, are screened in. Also, in order to set Area 2 as a screening area, stages St1 to St7 and stage St9, which are within a distance d of "1.5" from the stage of the target virtual user, are screened-in.

In the third embodiment, levels of the target virtual user are divided into two categories, and different screening areas with different sizes are set for the two categories. However, levels may be divided into a larger number of categories so that the size of the screening area increases as the level of the target virtual user improves.

As described above, the virtual user screening section 47a sets the screening area to be larger as the level of the target virtual user improves. Compared with a setting where the screening area is smaller, the target virtual user has a greater chance of finding relevant information regarding a candidate virtual user that can effectively assist the target virtual user in a battle against the enemy.

Figures 21, 22:
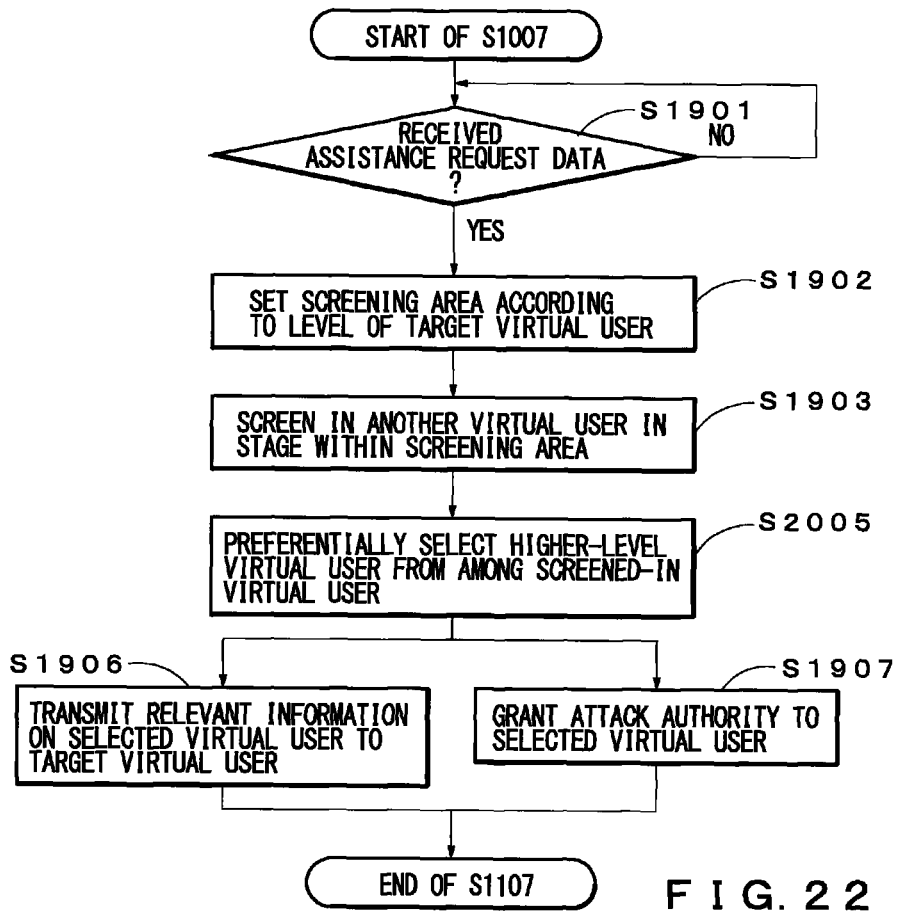
FIG. 21 is an explanatory diagram of a specific example of relevant information regarding another virtual user according to the third embodiment.
FIG. 22 is a flowchart for explaining an example of a modified transmission process according to the third embodiment.

FIG. 18B presents a table depicting a specific example of the results of setting the circular Area 1 as a screening area. FIG. 21 is a specific example of the results of setting Area 2, which is a circular area larger than Area 1, as a screening area. For example, by setting the screening area to be greater, the target virtual user clearly has a greater chance of finding relevant information regarding the candidate virtual users that can effectively assist the target virtual user in a battle against the enemy, compared with a setting where the screening area is smaller. In this way, the relationship building section 47 prompts the target virtual user of the terminal 3 to improve the level thereof. As a result, interest in the entire game can be stimulated.

FIG. 22 shows an example modification of the transmission process executed by the relationship building section 47 according to the third embodiment. As shown in the figure, step S2005 may be executed instead of steps S1904 and S1905, so that a virtual user with a higher level is selected from among the other screened-in virtual users, and the process proceeds to steps S1906 and S1907.

As described above, in this example modification, the relationship building section 47 sets a larger screening area as the level improves. Thereby, the relationship building section 47 provides the target virtual user with a greater chance of finding relevant information regarding the candidate virtual user that can effectively assist the target virtual user in a battle against the enemy, compared with a setting where the screening area is smaller.

(5) ADVANTAGEOUS EFFECT

With the game server of the present embodiments described above, the virtual position at which a virtual user can exist is located two dimensionally and stored as map data in the map data storing section 201, and this data can be displayed on the terminal 3 as an image of a two-dimensional map.

Thereby, when executing an action assigned to the virtual user at each virtual position, a plurality of virtual destination positions reachable by the virtual user can be provided. Based on the virtual distance between a target virtual user and another virtual user, relevant information regarding the other user can be transmitted. According to the present disclosure, relevant information regarding a virtual user other than the target virtual user can be transmitted based on the virtual distance therebetween, and the positional relationship between virtual users that can exist at positions in a virtual space can be used. Accordingly, a realistic world in a virtual space is constructed using a positional relationship between the target virtual user and another virtual user that can exist at virtual positions therein, and interest in the entire game can be stimulated.

Particularly, since the physical user can recognize this plurality of destinations by looking at the two-dimensional map on the terminal 3, a virtual region provided by the game part can be broadened visually as compared to the related art in which merely linear advancement was possible.

According to the present embodiments, the relationship building section 47 imposes a restriction on another user in the screening area whose relevant information is to be transmitted. A relationship between the target virtual user and another user in a short virtual distance from the target virtual user can thereby be built in terms of their action. The foregoing feature of the relationship building section 47 lends variety to the game.

Also, the relationship building section 47 selects a virtual user with a higher level—in other words, selects, from among at least one other virtual user restricted with regard to the virtual distance, a user available for assistance that can effectively assist the target virtual user. Relevant information regarding the virtual user thus selected can be presented to the terminal that is used to control the target virtual user.

In addition, the relationship building section 47 selects the virtual user with a larger number of interactions—in other words, selects, from among at least one other virtual user restricted with regard to the virtual distance—a user available for assistance that can effectively assist the target virtual user. Relevant information regarding the virtual user thus selected can be presented to the terminal that is used to control the target virtual user. Moreover, the relationship building section 47 sets a larger screening area as the level of the target virtual user improves, thereby prompting further improvement of the level of the target virtual user.

Also, the relationship building section 47 selects, from among at least one other virtual user restricted with regard to the virtual distance, a user available for assistance that can effectively assist the target virtual user in a battle against the enemy. Relevant information regarding the virtual user thus selected can be presented to the terminal that is used to control the target virtual user. Based on the virtual distance, the enemy battle processing section 46 restricts the authority to attack the enemy battling with the target virtual user, thereby lending variety to the game.

It is to be understood that the object of the present disclosure may also be accomplished by supplying a system or apparatus with a non-transitory storage medium in which a software program, which executes the functions of the above described embodiment is stored, and causing a computer (or CPU or MPU) of the system or apparatus to read out and execute the software program stored in the non-transitory storage medium.

In the above case, the software program read from the non-transitory storage medium executes the functions of the above described embodiment, and therefore the software program and the non-transitory storage medium in which the software program is stored are also an embodiment of the present disclosure.

Examples of the non-transitory storage medium for supplying the software program include a flexible disk, a hard disk, a magneto-optical disk, an optical disk such as a CD-ROM, a CD-R, a CD-RW, a DVD-ROM, a DVD-RAM, a DVD-RW and a DVD+RW, a magnetic tape, a nonvolatile memory card, and a ROM. Alternatively, the program may be downloaded via a network.

Further, it is to be understood that the functions of the above described embodiment may be accomplished not only by executing the software program read out by a computer, but also by causing an OS (operating system) or the like which operates on the computer to perform a part or all of the actual operations based on instructions of the software program.

Further, it is to be understood that functions of the above described embodiment may be accomplished by writing a software program read out from the non-transitory storage medium into a memory provided on an expansion board inserted into a computer or a memory provided in an expansion unit connected to the computer and then causing a CPU or the like provided in the expansion board or the expansion unit to perform a part or all of the actual operations based on instructions of the software program.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A game server comprising:
a map data storing section that stores map data representing a two-dimensional map on which virtual positions where at least one virtual user can exist are arranged in a virtual space;
a virtual position data table that stores identification data of a virtual user existing at each of the virtual positions;
a display process data transmitting section that transmits display process data for displaying an image of the two-dimensional map to a terminal connected via a communication network;
an operation data receiving section that receives operation data from the terminal;
a virtual user position changing section that changes the virtual position at which the virtual user exists to a virtual position of a destination when accumulated points consumed in accordance with a received content of the operation data is greater than or equal to points required for the virtual user to reach the virtual position of the destination;
a data updating section that updates the identification data of the virtual user, which exists at each of the virtual positions, stored in the virtual position data table when the virtual position at which the virtual user exists is changed;
a relationship building section that transmits relevant information regarding another virtual user to the terminal based on a distance between a virtual position, on the two-dimensional map, of a target virtual user controlled via the terminal and a virtual position of the another virtual user; and
an attribute information storing section that stores, as attribute information, a level of each virtual user existing in the virtual space, the level indicating a skill of the virtual user, wherein:
the relationship building section sets a screening area covering a predetermined distance from the virtual position of the target virtual user on the two-dimensional map, and the relationship building section selects a virtual user with a higher level from among at least one other virtual user existing at a virtual position in the screening area thus set and transmits relevant information regarding the other virtual user thus selected.

2. The game server according to claim 1, wherein:
the relationship building section increases a size of a screening area as the level of the target virtual user improves and transmits relevant information regarding the at least one other virtual user in the screening area thus set.

3. The game server according to claim 1 further comprising:
an enemy battle processing section that processes a battle between the target virtual user and an enemy that has appeared at the virtual position of the target virtual user, wherein:
the operation data receiving section receives, from the target virtual user, assistance request data to request assistance of the other virtual user when the target virtual user battles with the enemy that has appeared at the virtual position thereof; and
upon reception of the assistance request data, the relationship building section transmits, to the target virtual user, relevant information regarding the other virtual user that is a candidate for assistance.

4. The game server according to claim 3, wherein:
to the other virtual user that is a candidate for assistance, the enemy battle processing section grants authority to attack the enemy battling with the target virtual user.

5. A game server comprising:
a map data storing section that stores map data representing a two-dimensional map on which virtual positions where at least one virtual user can exist are arranged in a virtual space;
a virtual position data table that stores identification data of the virtual user existing at each of the virtual positions;
a display process data transmitting section that transmits display process data for displaying an image of the two dimensional map to a terminal connected via a communication network;
an operation data receiving section that receives operation data from the terminal;
a virtual user position changing section that changes the virtual position at which the virtual user exists to a virtual position of a destination when accumulated points consumed in accordance with a received content of the operation data is greater than or equal to points required for the virtual user to reach the virtual position of the destination;
a data updating section that updates the identification data, which exists at each of the virtual positions, stored in the virtual position data table when the virtual position at which the virtual user exists is changed; and
a relationship building section that transmits relevant information regarding another virtual user to the terminal based on a distance between a virtual position, on the two-dimensional map, of a target virtual user controlled via the terminal and a virtual position of the another virtual user, wherein:

the relationship building section sets a screening area covering a predetermined distance from the virtual position of the target virtual user on the two-dimensional map, and the relationship building section calculates a number of interactions representing a strength of a relationship between the target virtual user and each of at least one other user existing at a virtual position in the screening area thus set, selects a virtual user with a larger number of interactions from among the at least one other user, and transmits relevant information regarding the other virtual user thus selected.

6. The game server according to claim 5 further comprising:

an attribute information storing section that stores, as attribute information, a level of each virtual user existing in the virtual space, which indicates a skill thereof, wherein:

the relationship building section increases a size of a screening area as the level of the target virtual user improves and transmits relevant information regarding the at least one other virtual user in the screening area thus set.

7. The game server according to claim 5 further comprising:

an enemy battle processing section that processes a battle between the target virtual user and an enemy having appeared at the virtual position of the target virtual user, wherein:

the operation data receiving section receives, from the target virtual user, assistance request data to request assistance from the other virtual user when the target virtual user battles with the enemy having appeared at the virtual position thereof; and upon reception of the assistance request data, the relationship building section transmits, to the target virtual user, relevant information regarding the other virtual user that is a candidate for assistance.

8. A game controlling method executed by a computer connected to a communication network, the method comprising the steps of:

transmitting, to a terminal connected via the communication network, data for displaying an image of virtual positions where a virtual user can exist, the virtual positions being arranged on a two-dimensional map in a virtual space;

receiving operation data from the terminal;

changing the virtual position where a virtual user can exist to a virtual position of a destination when accumulated points consumed in accordance with received content of the operation data is greater than or equal to points required for the virtual user to reach the virtual position of the destination;

updating identification data of the virtual user existing at each of the virtual positions stored in a virtual position data table when the virtual position at which the virtual user exists is changed; and transmitting, based on a distance between a virtual position of a target virtual user controlled via the terminal and a virtual position of another virtual user, relevant information regarding the another virtual user to the terminal, wherein:

in the step of transmitting the relevant information regarding the another virtual user, a screening area covering a predetermined distance from the virtual position of the target virtual user on the two-dimensional map is set, and a virtual user whose level is higher is selected from among at least one other virtual user existing at a virtual position in the screening area thus set, and relevant information regarding the other virtual user thus selected is transmitted, the level indicating a skill of each of the at least one other virtual user existing in the virtual space that is stored as attribute information in an attribute information storing section.

9. A game controlling method executed by a computer connected to a communication network, the method comprising the steps of:

transmitting, to a terminal connected via the communication network, data for displaying an image of virtual positions where a virtual user can exist, the virtual positions being arranged on a two-dimensional map in a virtual space;

receiving operation data from the terminal;

changing the virtual position where a virtual user can exist into a virtual position of a destination when accumulated points consumed in accordance with a received content of the operation data is greater than or equal to points required for the virtual user to reach the virtual position of the destination;

updating identification data regarding the virtual user existing at each of the virtual positions stored in a virtual position data table when the virtual position at which the virtual user exists is changed; and transmitting, based on a distance between a virtual position of a target virtual user controlled via the terminal and a virtual position of another virtual user, relevant information regarding the another virtual user to the terminal, wherein:

in the step of transmitting the relevant information regarding the another virtual user, a screening area covering a predetermined distance from the virtual position of the target virtual user on the two-dimensional map is set; and for each of at least one other virtual user existing at the virtual position in the screening area thus set, a number of interactions between the target virtual user and each of the at least one other virtual user, which represents strength of a relationship therebetween, is calculated, a virtual user with a larger number of interactions is selected from among the at least one other virtual user, and relevant information regarding the other virtual user thus selected is transmitted.

10. A non-transitory computer-readable medium storing a program executable by a server computer to perform game operations, the program comprising the steps of:

transmitting, to a terminal connected via a communication network, data for displaying an image of virtual positions where a virtual user can exist, the virtual positions being arranged on a two-dimensional map in a virtual space;

receiving operation data from the terminal;

changing the virtual position where a virtual user can exist to a virtual position of a destination when accumulated points consumed in accordance with a received content of the operation data is greater than or equal to points required for the virtual user to reach the virtual position of the destination;

updating identification data of the virtual user existing at each of the virtual positions stored in a virtual position data table when the virtual position at which the virtual user exists is changed; and transmitting, based on a distance between a virtual position of a target virtual user controlled via the terminal and a virtual position of another virtual user, relevant information regarding the another virtual user to the terminal, wherein:

in the step of transmitting the relevant information regarding the another virtual user, a screening area covering a predetermined distance from the virtual position of the target virtual user on the two-dimensional map is set, a virtual user whose level is higher is selected from among at least one other virtual user existing at a virtual position in the screening area thus set, and relevant information regarding the other virtual user thus selected is transmitted, the level indicating a skill of each virtual user existing in the virtual space that is stored as attribute information in an attribute information storing section.

11. A non-transitory computer-readable medium storing a program executable by a server computer to perform game operations, the program comprising the steps of:

transmitting, to a terminal connected via a communication network, data for displaying an image of virtual positions where a virtual user can exist, the virtual positions being arranged on a two-dimensional map in a virtual space;

receiving operation data from the terminal;

changing the virtual position where a virtual user can exist to a virtual position of a destination when accumulated points consumed in accordance with received content of the operation data is greater than or equal to points required for the virtual user to reach the virtual position of the destination;

updating identification data of the virtual user existing at each of the virtual positions stored in a virtual position data table when the virtual position at which the virtual user exists is changed; and transmitting, based on a distance between a virtual position of a target virtual user controlled via the terminal and a virtual position of another virtual user, relevant information regarding the another virtual user to the terminal, wherein:

in the step of transmitting the relevant information regarding the another virtual user, a screening area covering a predetermined distance from the virtual position of the target virtual user on the two-dimensional map is set; and for each of at least one other virtual user existing at the virtual position in the screening area thus set, a number of interactions between the target virtual user and each of the at least one other virtual user, which represents strength of a relationship therebetween, is calculated, a virtual user with a larger number of interactions is selected from among the at least one other virtual user, and relevant information regarding the other virtual user thus selected is transmitted.

12. A game system comprising a game server and at least one terminal connected thereto via a communication network:

the game server comprising:

a map data storing section that stores virtual positions where a virtual user can exist as map data, the virtual positions being arranged on a two-dimensional map in a virtual space;

a virtual position data table that stores identification data of the virtual user existing at each of the virtual positions;

a display process data transmitting section that transmits display process data for displaying an image of the two dimensional map to a terminal connected via the communication network;

an operation data receiving section that receives operation data from the terminal;

a virtual user position changing section that changes the virtual position at which the virtual user exists to a virtual position of a destination, when accumulated points consumed in accordance with a received content of the operation data is greater than or equal to points required for the virtual user to reach the virtual position of the destination;

a data updating section that updates the identification data stored in the virtual position data table when the virtual position at which the virtual user exists is changed;

a relationship building section that, based on a distance between a virtual position of a target virtual user on the two-dimensional map controlled via the terminal and a virtual position of another virtual user, transmits relevant information regarding the another virtual user to the terminal; and an attribute information storing section that stores, as attribute information, a level of each virtual user existing in the virtual space, which indicates a skill thereof, wherein:

the relationship building section sets a screening area covering a predetermined distance from the virtual position of the target virtual user on the two-dimensional map, and the relationship building section selects a virtual user with a higher level from among at least one other virtual user existing at a virtual position in the screening area thus set and transmits relevant information regarding the other virtual user thus selected.

13. A game system comprising a game server and at least one terminal connected thereto via a communication network:

the game server comprising:

a map data storing section that stores virtual positions where a virtual user can exist as map data, the virtual positions being arranged on a two-dimensional map in a virtual space;

a virtual position data table that stores identification data of the virtual user existing at each of the virtual positions;

a display process data transmitting section that transmits display process data for displaying an image of the two dimensional map to a terminal connected via the communication network;

an operation data receiving section that receives operation data from the terminal;

a virtual user position changing section that changes the virtual position at which the virtual user exists to a virtual position of a destination, when accumulated points consumed in accordance with a received content of the operation data is greater than or equal to points required for the virtual user to reach the virtual position of the destination;

a data updating section that updates the identification data stored in the virtual position data table when the virtual position at which the virtual user exists is changed; and a relationship building section that, based on a distance between a virtual position of a target virtual user on the two-dimensional map controlled by the terminal and a virtual position of another virtual user, transmits relevant information regarding the another virtual user to the terminal, wherein:

the relationship building section sets a screening area covering a predetermined distance from the virtual position of the target virtual user on the two-dimensional map, and the relationship building section calculates a number of interactions between the target virtual user and each of at least one other virtual user existing at a virtual position in the screening areas thus set, which represents strength of a relationship therebetween, selects a virtual user with a larger number of interactions from among the at least one other virtual user, and transmits relevant information regarding the other virtual user thus selected.

* * * * *